United States Patent [19]

Nomura et al.

[11] Patent Number: 5,216,341
[45] Date of Patent: Jun. 1, 1993

[54] WINDSHIELD WIPER CONTROL APPARATUS

[75] Inventors: Tetsuya Nomura, Suita; Yasuhiro Fujita, Kobe, both of Japan

[73] Assignee: Fujitsu Ten Limited, Hyogo, Japan

[21] Appl. No.: 775,553

[22] Filed: Oct. 15, 1991

Related U.S. Application Data

[63] Continuation of Ser. No. 452,379, Dec. 19, 1989, Pat. No. 5,117,168.

[30] Foreign Application Priority Data

| Dec. 19, 1988 | [JP] | Japan | 63-321684 |
| Dec. 19, 1988 | [JP] | Japan | 63-321685 |
| Jan. 10, 1989 | [JP] | Japan | 1-4023 |
| Jul. 5, 1989 | [JP] | Japan | 1-174834 |
| Oct. 14, 1989 | [JP] | Japan | 1-267797 |
| Oct. 14, 1989 | [JP] | Japan | 1-267798 |
| Oct. 14, 1989 | [JP] | Japan | 1-267799 |

[51] Int. Cl.$^5$ .............................................. B60S 1/08
[52] U.S. Cl. ................................ 318/444; 318/DIG. 2
[58] Field of Search .............. 318/443, 444, DIG. 2, 318/483; 307/9.1, 10.1; 15/250 C, 250.17

[56] References Cited

U.S. PATENT DOCUMENTS

| 3,794,847 | 2/1974 | Cadiou | 307/117 |
| 4,317,073 | 2/1982 | Blaszkowski | 318/483 |
| 4,355,271 | 10/1982 | Noack | 318/480 |
| 4,463,294 | 7/1984 | Gibson | 318/483 X |
| 4,476,419 | 10/1984 | Fukatsu et al. | 318/444 |
| 4,542,325 | 9/1985 | Kobayashi et al. | 318/483 |
| 4,588,935 | 5/1986 | Kaneiwa et al. | 318/483 |
| 4,595,866 | 6/1986 | Fukatsu et al. | 318/444 |
| 4,665,351 | 5/1987 | Nyberg | 318/483 |
| 4,740,735 | 4/1988 | Hayashi | 318/483 |
| 4,987,354 | 1/1991 | Steinmann | 318/444 |

*Primary Examiner*—Bentsu Ro
*Attorney, Agent, or Firm*—Wenderoth, Lind & Ponack

[57] ABSTRACT

A windshield wiper control apparatus compensates for small-diameter raindrops such as a drizzle and raindrops splashed over by a preceding vehicle which may worsen the visibility of a driver even though the level of precipitation is not much and accumulatively calculates the amount of raindrops just after the wiping action of a wiper blade, thereby causing an optimized automatic wiping action to be realized. In addition, a windshield wiper control apparatus effects an automatic wiper operation without modifications and additional use of new operating switches by only adding a new control device between the conventional windshield apparatus not having any automatic wiper operation and the wiper blade driver.

7 Claims, 28 Drawing Sheets

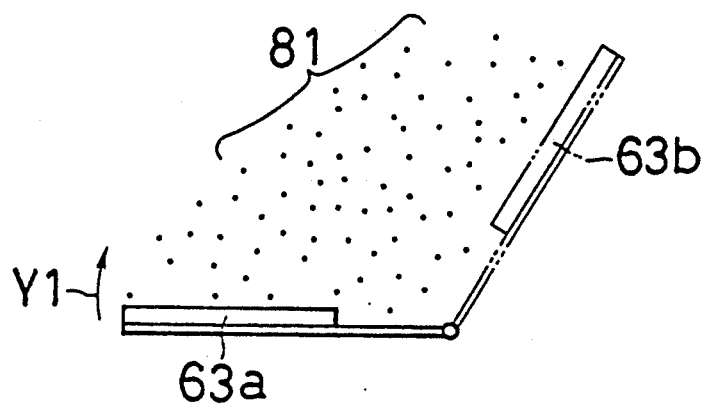
Fig. 5 (1)
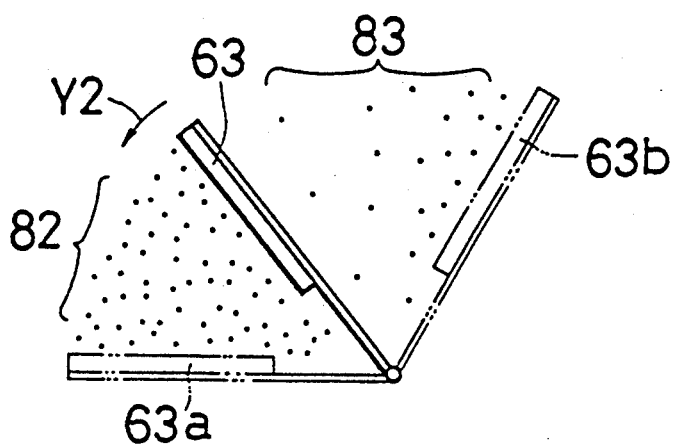
Fig. 5 (2)

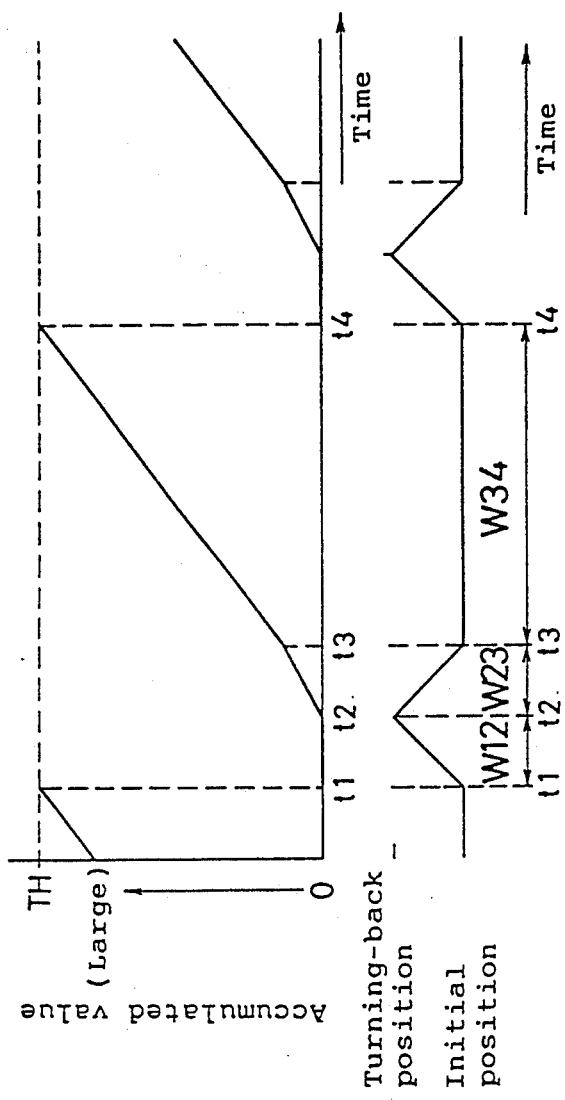
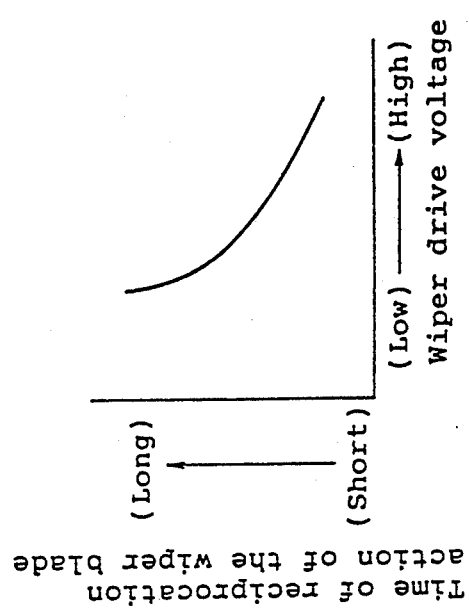
Fig. 6 (1)
Fig. 6 (2)
Fig. 7

Fig. 11 (1) 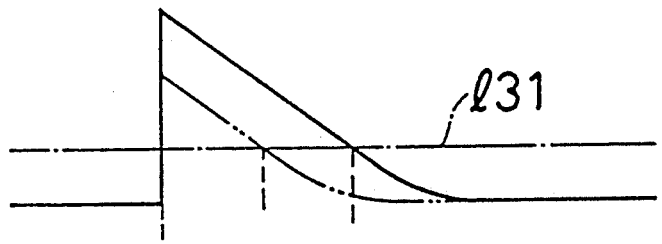
Fig. 11 (2) 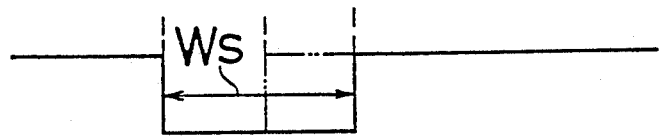
Fig. 12
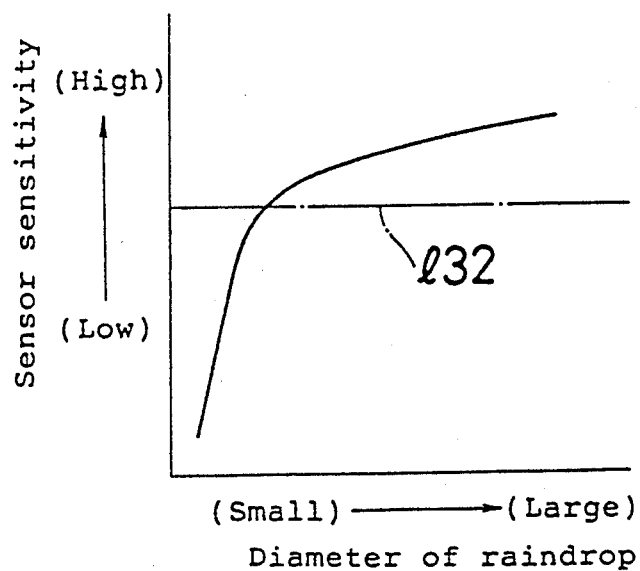

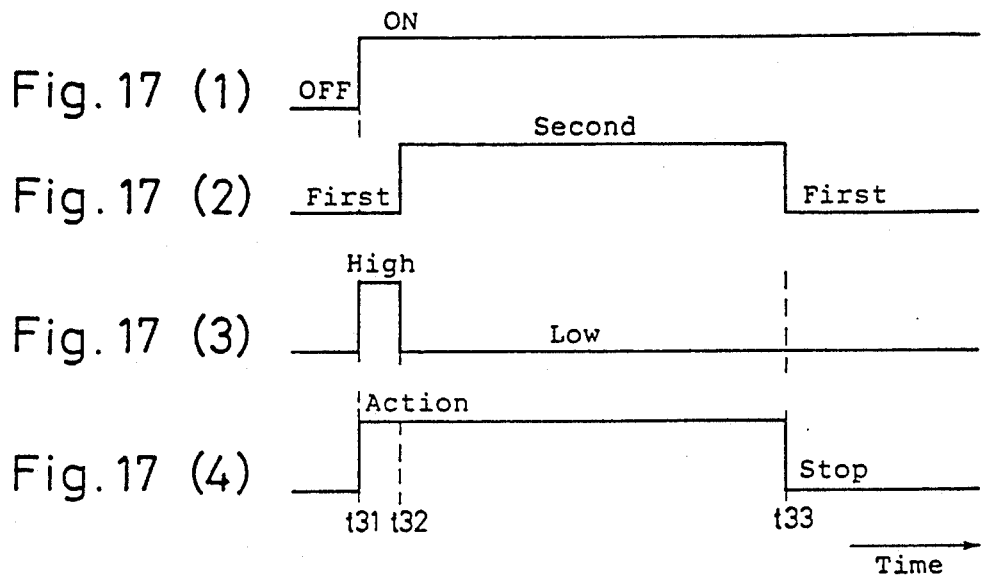
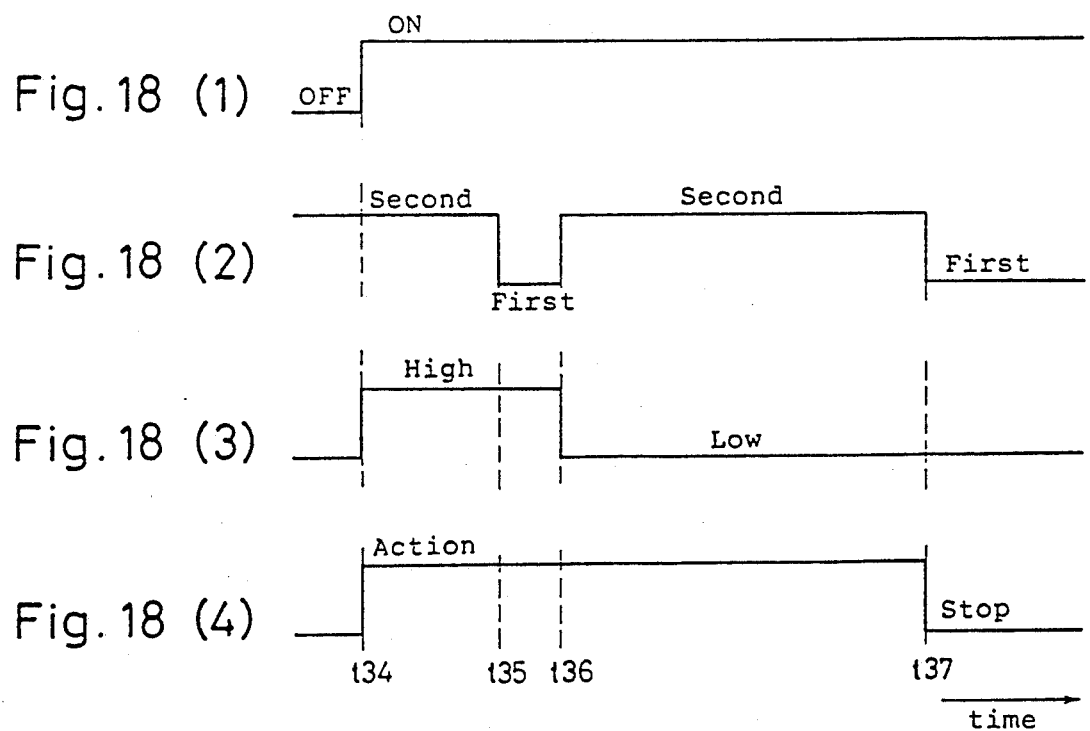

Fig. 22 (1) 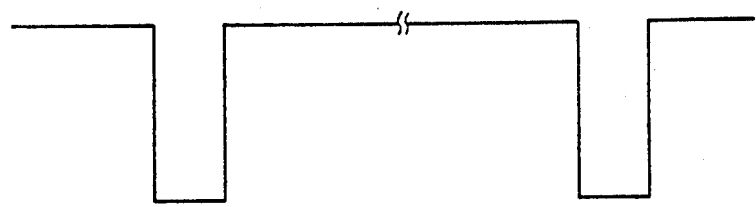
Fig. 22 (2) 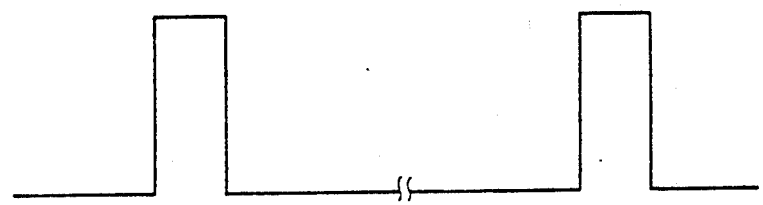
Fig. 22 (3) 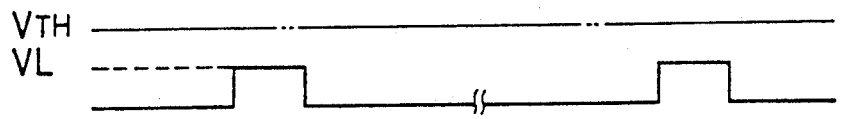
Fig. 22 (4) 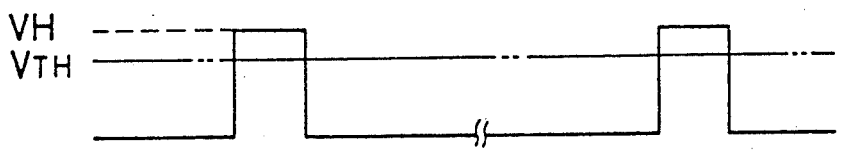

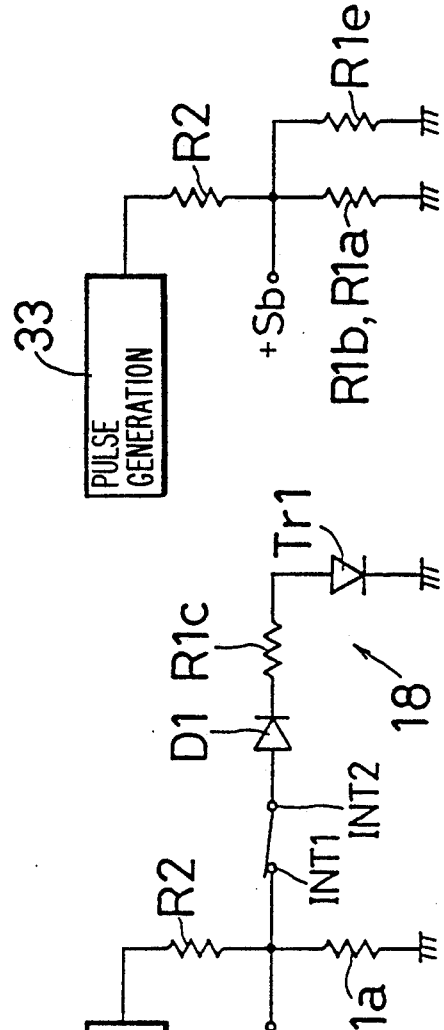
Fig. 23 (3)
Fig. 23 (3)
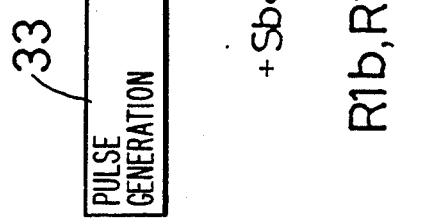
Fig. 23 (1)
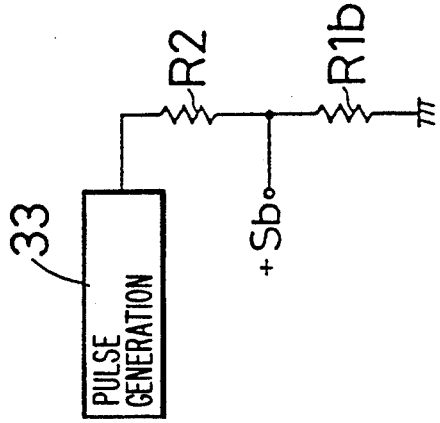

Fig. 24 (1) 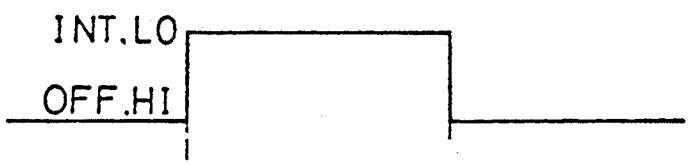
Fig. 24 (2) 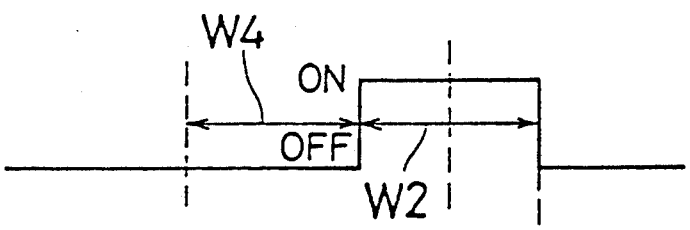
Fig. 24 (3) 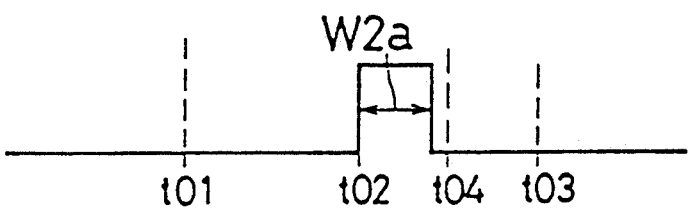

WINDSHIELD WIPER CONTROL APPARATUS

This application is a continuation of application Ser. No. 07/452,379 filed Dec. 19, 1989. Now U.S. Pat. No. 5,117,168.

BACKGROUND OF THE INVENTION

1. Field of the Invention

The present invention relates to a windshield wiper control apparatus for driving wiper blades at a wiping interval best-suited to the level of precipitation.

2. Description of the Prior Art

An automatic windshield wiper control apparatus which controls wiper operations on the basis of signals detected by a rain sensor accumulatively calculates the signals detected by the rain sensor, and initiates a wiping action when an accumulated value exceeds a certain predetermined value. Conventionally, an apparatus which calculates from the point of initiating the movement of the wiper or from the point of terminating the movement thereof has been available.

FIGS. 1(1)-1(2) are timing charts for explaining the movements of a conventional windshield wiper control apparatus which accumulatively calculates the detected signals of a rain sensor at the same time that the wiper starts. FIG. 1 (1) shows variations of the accumulated value of the detected signals with respect to time, and FIG. 1 (2) shows varations of an action position of the wiper blades with respect to time, respectively. Also, the explanation below assumes that the level of the precipitation is constant.

In the case where the accumulated value reaches the predetermined threshold value $TH_0$ at time $t11$, the wiper blade which is housed in the initial position initiates the wiping action. At the same time that the wiping action the accumulated value is cleared out once. Thereafter, the detected signals of the rain sensor are accumulatively calculated. The wiper blade reaches the turning-back position at time $t12$ and again returns to the initial position thereof at time $t13$. Even through the wiper blade returns to the initial position, the detected signals of the rain sensor are further accumulatively calculated, and the accumulated value reaches the threshold value $TH_0$ at time $t14$. Thus, a wiping action similar to the case mentioned above is again initiated.

FIGS. 2(1)-2(2) are timing charts for explaining the movements of another conventional windshield wiper control apparatus which calculates the detected signals of the rain sensor at the same time as terminating the wiping action. As in FIG. (1), FIG 2(1) shows variations of the accumulated value of the detected signals of the rain sensor with respect time, and FIG. 2 (2) shows variations of an action position of the wiper blade with respect to time, respectively. Also, the following assumes that the level of the precipitation is constant. The point which is different from the conventional example discussed above is that the calculation-initiating point of the detected signals of the rain sensor is from time $t23$ which is the point of terminating the wiping action. Namely, the wiping action starts at time $t21$ when the accumulated value reaches the threshold value $TH_0$, and the accumulated value is not calculated up to the time $t23$ when the wiper reaches the initial position via the turning-back point at time $t22$. Then, the apparatus starts to calculate the detected signals of the rain sensor form the time $t23$, and again the wiping action initiates at time $t24$ when the accumulated value reaches the threshold value $TH_0$.

On the other hand, it is optimal that the wiping action is activated at the time when raindrops attached to the exterior surface of a windshield reach a certain fixed level of precipitation and obstructs vision through the windshield. Therefore, as in the former conventional apparatus, the value calculated in the period from the $t11$ to the time $t12$ is wiped off by the wiping action in the period from the time $t12$ to the time $t13$, the wiping action to be effected from the time $t14$ is an unnecessary accumulated value. Therefore, since the time at which the accumulated value reaches the threshold value $TH_0$ is faster due to the unnecessary calculation in the period from the time $t11$ to the time $t12$, a driver feels that the wiping action initiation on has occurred a little early.

The latter conventional apparatus has solved a problem which exists in the former conventional apparatus, in the point that the detected signals of the rain sensor are not calculated during the period of activation of the wiper blades from the initial position to the turning-back position like the former conventional apparatus. However, since the detected signals during the period from the time $t22$ to the time $t23$, during which the wiper blades return form the turning-back position to the initial position, are not calculated, the driver feels that the time at which the wiping action initiation has occured has been delayed. That is, it is necessary to calculate the detected signals for raindrops which attach just after a wiping action by the wiper blades in the period during which the wiper blades return from the turning-back position to the initial position.

The time at which the driver feels that he wants to activate the wiper as raindrops attach to a front windshield of a vehicle differs according to the size of the raindrops, the level of precipitation or the running speed of the vehicle. Particularly, since a drizzle, or raindrops which are splashed out by the preceding vehicle are very small in diameter, it is difficult for them to flow down after they attached to the front windshield. So, even though the amount precipitation is small, they will obstruct vision through the windshield. The larger the diameter of the raindrops becomes, the more the sensitivity of the rain sensor is heightened.

However, as discussed above, the windshield wiper control apparatuses of the prior art are composed so as to activate the wiper blades when the accumulated value obtained by calculating the output of the rain sensor exceeds a predetermined threshold value. Therefore, the wiper blades are not driven until the accumulated value exceeds the threshold value, regardless of the diameter of raindrops. For this reason, it may become difficult to secure the visibility of a driver, and the driver feels uncomfortable since there is a difference between the wiping interval desired by the driver and the actual wiping interval of the wiper blades.

Futhermore, the conventional windshield wiper control apparatuses have been composed so as to initiate the wiping action at the same time as operating the wiper switch. The wiping action (hereinafter called "initial action") which is executed at the same time as operating this wiper switch must wipe off water drops or the like instantly when a driver wishes, and this initial action is executed for the sake of making sure of whether or not the wiper can normally operate.

Hereupon, in the conventional windshield wiper control apparatuses, when a cam switch for detecting the action position of wiper blades changes, for example, from the ON mode thereof (in wiping off water drops or the like) to the OFF mode thereof (in the housing position of the wiper blades), it is judged that the initial action has been competed, and that the wiper blades have normally operated.

However, in these apparatuses, as the initial action is judged only by the changing of the cam switch from the ON mode to the OFF mode, the following inconveniences may occur. Namely, in the case where a power source to be supplied for controlling the wiper blades is turned off while the apparatus is in action, or where the wiper switch is turned on, off and on while the wiper is in action, the wiper blades do not carry out a complete wiping action, and it may be likely to only effect a part of the wiping action. Furthermore, the wiping action may be executed either on the basis of the drive signals generated from the apparatus or so as to automatically store the wiper blades in the housing portions thereof being turned since the cam switch has been kept on being turned, without depending upon control signals from the apparatus. Therefore, it is impossible to judge whether or not the wiper operates normally which is one of the objects of the initial action.

Also, in a previous windshield wiper control apparatus not having an automatic wiper function, a wiper switch for selecting the action modes of the wiper and a control circuit for effecting the wiping action in response to a setting state of the switch are arranged on a single printed circuit board and are integrally united in a body, in order to make the apparatus small in size. In order to newly furnish this apparatus with the automatic wiper function, it is necessary to provide the apparatus with a new control circuit for detecting that the wiper switch is set to the intermittent mode, and controlling the wiper operation by calculating the period of intermittence in response to the level of precipitation detected according to the output of the rain sensor.

However, in the case that the previous control circuits and the wiper switch are integrally united in a body as discussed above, it is difficult to internally detect the setting state of the wiper switch. For this reason, in the typical prior art, a switch used only for the automatic wiper function is separately added for a composition of automatic wiper operation.

Therefore, in order to effect the automatic wiper operation in the prior art discussed above it is necessary to operate the exclusive switch for a newly added automatic wiper function. Furthermore, since this added switch is arranged at a position separate from the original wiper switch, it results in a confusion and inferior operation.

Also, additionally mounting the exclusive switch for an automatic wiper function results in a necessity of modifications in the vicinity of the mounting position. Still another problem such as an unbalance between the exclusive switch for the additionally mounted automatic wiper function and the previous switch may result therefrom.

SUMMARY OF THE INVENTION

Therefore, to solve the problems mentioned above, it is an object of the invention to provide a novel and improved windshield wiper control apparatus.

It is another object of the present invention to provide a windshield wiper control apparatus by which the wiper can be driven at an interval best-suited to the feeling of a driver.

In order to accomplish these and other objects mentioned above, a windshield wiper control apparatus according to the present invention comprises;

a rain sensor for detecting the level of precipitation;

a wiper blade for eliminating matter to be wiped off, the matter attaching to an exterior surface of a windshield;

a wiper driving means for reciprocating the wiper blade on the exterior surface of the windshield;

an action status detecting means for detecting whether or not the wiper blade is in action;

a wiper control means for accumulatively calculating the amount of rain on the basis of an output of a rain sensor and for outputting a driving signal for activating the wiper blade to the wiper driving means when the accumulated value exceeds a predetermined threshold value, and a reducing means for compensating the accumulated amount to a smaller level while the wiper blade is in action as compared to the accumulated amount while the wiper blade is not in cation, in response to the output of the action status detecting means.

In a preferred embodiment of the present invention, the action status detecting means comprises a position detecting means for detecting an action position of the wiper blade, and the compensating means reduces the value accumulated until the wiper blade arrives at the turning-back position on the exterior surface to zero in response to the output of the position detecting means.

In another preferred embodiment of the invention, the compensating means compensates the value accumulated until the wiper blade returns to the stop position thereof from the turning-back position thereof.

In a still another preferred embodiment of the invention, the compensating means reduces the accumulated value by a factor of 4 while the wiper blade is in action.

According to the present invention, the wiper control means accumulatively calculates as the amount of precipitation on the basis of the output of the rain sensor. When the accumulated value exceeds the predetermined threshold value, the wiper blade is driven by the wiper driving means to effect the wiping action until the wiper blade returns to the stop position again through the turning-back position from the stop position. The stoppage of the wiper blade is detected by the action status detecting means composed of the position detecting means or the like which detects the action position of the wiper blade, that is whether or not the wiper blade is in action wherein the wiping action is being carried out. According to the results of this detection, the compensating means reduces the accumulated value of the wiper control means, for example, reduces the accumulated value to zero up to the point when the wiper blade arrives at the turning-back position on the exterior surface, and further reduces the value accumulated value by a factor of 2 until the wiper blade returns from the turning-back position to the stop position, or the time to reach the turning-back position while the wiper blade is in action, in comparing the operating state of the wiper blade with the non-operating state thereof.

Therefore, the value accumulated after compensation corresponds to the amount obtained by subtracting the amount eliminated by the wiping actions of the wiper blade from the total amount of raindrops attached to the exterior surface during the wiper operation, i.e., the amount of raindrops which attached to the exterior surface after the wiping action, thereby causing the wipe starting timing of the wiper blade to be in accord with the timing which the driver desires.

In order to accomplish the objects mentioned above, a windshield wiper control apparatus wherein a wiper blade is driven when an accumulated value, obtained by accumulatively calculating an output from a rain sensor, exceeds a predetermined threshold value, comprises:

a detecting means for detecting the size of raindrops and a compensating means for adjusting either the threshold value or the output signal of the rain sensor on the basis of the output of the detecting means.

In a preferred embodiment of the present invention, the compensating means reduces the threshold value to a smaller value when the size of the raindrops is small than when the size of the raindrops is large.

In another preferred embodiment of the present invention, when the threshold value is reduced to the smaller value, the number of pulses of the output signal of the rain sensor is accumulatively calculated, and when the threshold value is raised to a larger value, the width of the pulses of the output signal is accumulatively calculated.

In a still another preferred embodiment, the compensating means adjusts the output signals of the rain sensor so as to become larger when the size of raindrops is small.

The windshield wiper control apparatus according to the present invention comprises a detecting means for detecting the size of raindrops and a compensating means for adjusting either the output signal of the rain sensor or the threshold value according to the output of the detecting means. The windshield wiper control apparatus drives the wiper blade when the accumulated value of the output of the rain sensor exceeds a threshold value on the basis of the output signal of the rain sensor and the threshold value after compensation.

The compensation is accomplished by providing two threshold values and selecting a first threshold value when the output level of the rain sensor is lower than a predetermined value and a second threshold value which is larger than the first threshold value, when the output level of the rain sensor is larger than the predetermined value, thereby causing the wiper blade to be driven at the optimal interval suited to the level of precipitation even though the rain drop diameter is small and the accumulated value is small, causing the visibility of the driver to be secured without fail and causing a smooth wiping action, which is in accord with the feeling of the driver.

Also, the compensation is effected by accumulatively calculating the number of pulses of the output signal of the rain sensor when a smaller value, i.e., the first threshold value is selected the threshold value and accumulatively calculating the width of pulse of the output signal when the second threshold value is selected. Thus, when the signal level is low and the linearity between the raindrop diameter and the sensor sensitivity can not be secured, the number of pulses is calculated, and the wiping action is more adaptive to the level of precipitation.

Furthermore, the compensation is effected by making the output signal of the rain sensor larger when the raindrops are small, in corresponding to the output value, thereby also causing the wiping action to be adaptive to the level of precipitation.

It is still further another object of the present invention to provide a windshield wiper control apparatus whose operability is excellent without additionally using any exclusive switch.

In order to achieve this object, a windshield wiper control apparatus according to the present invention comprises;

a driving means for reciprocating a wiper blade a first control means for manually selecting a first action mode wherein the wiper blade is consecutively reciprocated and a second action mode wherein the wiper blade is intermittently driven, and for directly driving the driving means, and a second control means, which intervenes between the driving means and the first control means, for controlling the driving means so as to effect the action status corresponding to the level of precipitation in response to the output of the raindrop detecting means when the first control means is set to the second action mode.

In a preferred embodiment according to the present invention, the first control means is provided with a plurality of contacts to effect a switching status corresponding to the first and the second modes, and the second control means generates the discrimination signal and gives it to the first control means and detects the switching status of the contacts corresponding to the second action mode.

According to the present invention, the second control means outputs the discrimination signal to the first control means and detects the action modes on the basis of the output in response to the discrimination signal which changes according to the switching status of the contacts in the first control means. When the second control means detects that the first control means is set to the second action mode in which the wiper blade is intermittently driven, the second control means detects the output from the raindrop detecting means and can control the driving means to effect the action corresponding to the level of precipitation by using the detected value.

Therefore, by only adding the second control means to the previous windshield wiper control apparatus not having any automatic wiper operation, it is possible easily to secure the operation of the automatic wiper control. In addition, as the second control means can automatically judge the setting condition of the wiper switch, there is no need to provide any exclusive control switch for the automatic wiper, thereby causing the driver to be free from troublesomeness in the operation of the wiper. Furthermore, there is no need to separately provide an exclusive switch for the automatic wiper, thereby causing the cost of production to be lessened and the work for securing an automatic wiper control to be facilitated.

Also in a preferred embodiment of the present invention, the driving means is provided with at least two kinds of power input terminals, one for low speed and the other is for high speed, and the second control means is power-charged when the first control means is switched to the second action mode.

Therefore, the second control means is not power-charged while the movemental control of the wiper is in pause or while the control is in consecutive action, thereby causing the basic functions of the first control means to be secured even when the second control means is out of order, such that a fail-safe operation is accomplished, too.

In a still another preferred embodiment of the present invention, the first control means automatically switches the driving means to the first action mode when washer liquid is ejected, and a detecting period of the switching status is shortened when the washer liquid is ejected.

Therefore, even though a response delay should occur from start of the washer ejection to start of the power supply to the second control means, the action mode of the first control means can be detected in a short time up to termination of the washer liquid ejection, thereby preventing the erroneous detection of the action modes and causing the wiping action when the washer liquid is ejected to be secured. Besides, when the washer liquid is not ejected, high precision detection can be carried out in the normal detecting period.

In another preferred embodiment of the present invention, a cam switch is provided in connection with the driving means, and the switching status thereof is changed according to whether or not the wiper blade is in a predetermined pause position and power is supplied to the driving means until the wiper blade returns to the pause position when the first control means is switched to a stop mode while the wiper blade is in action, and the second control means feeds the output of the cam switch directly into the first control means when any abnormality occurs in the raindrop detecting means and can intermittently drive the driving means with a predetermined intermittent interval.

Therefore, the intermittent action can be secured even when the raindrop detecting means is out of order.

BRIEF DESCRIPTION OF THE DRAWINGS

These and other objects of the invention, as well as the features and advantages thereof, will be better understood and appreciated form the following detailed description and the accompanying drawings, in which:

FIGS. 5(1)–5(2) are views for explaining the relationship between the wiping action and an attaching state of water droplets;

FIGS. 6(1)–6(2) are timing charts for explaining the first embodiment of the present invention;

FIG. 7 is a graph showing the relationship between wiper driving voltage and time needed for reciprocation of the wiper blade;

FIGS. 11(1)–11(2) are waveforms chart with regard to the output of the rain sensor 51 and the detected signal rectified the output thereof;

FIG. 12 is a graph showing a characteristics of sensitivity of the rain sensor 51 for the raindrop diameter;

FIGS. 17(1)–17(4) are timing charts for explaining the action of the wiper blade 63 in the case that the wiper switch 55 is turned on when the wiper blade 63 is located in the first area;

FIGS. 18(1)–18(4) are timing charts for explaining the action of the wiper blade 63 in the case that the wiper switch 55 is turned on when the wiper blade 63 is located in the second area;

FIGS. 22(1)–22(4) are waveform charts for explaining inspection action to read the setting mode of the wiper switch 11;

FIGS. 23(1)–23(3) are equivalence circuit diagrams when a pulse is impressed to the switch circuit 1;

FIGS. 24(1)–24(3) are timing charts for explaining the inspection action in the washer interlocked action;

FIG. 29 is a flowcharts for explaining the mode judgement action of the windshield wiper control apparatus 10a;

DETAILED DESCRIPTION OF THE PREFERRED EMBODIMENT

Figure 1:
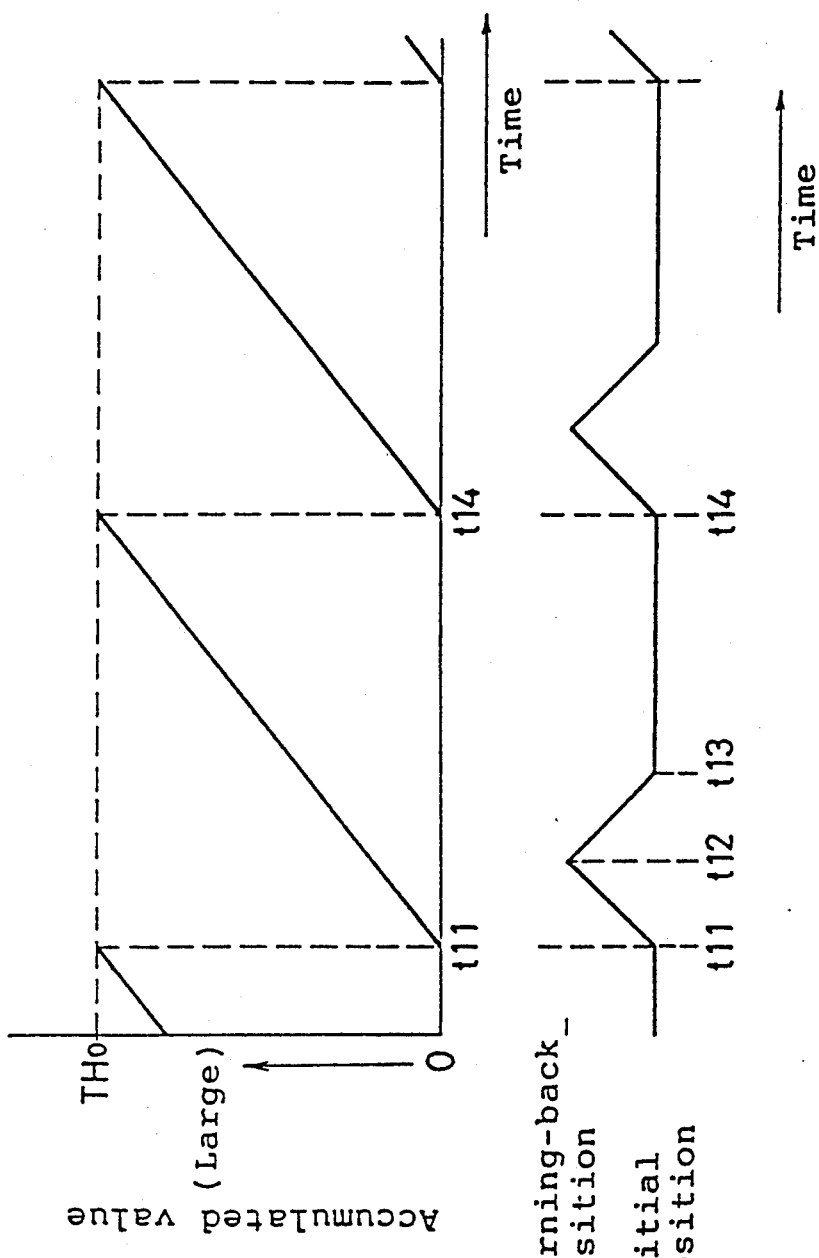
FIGS. 1(1)–1(2) are timing charts for explaining the movements of a windshield wiper control apparatus of the prior art, by which at the same time as the wiping action is initiated, the detected signal of the rain sensor is calculated.
Figure 2:
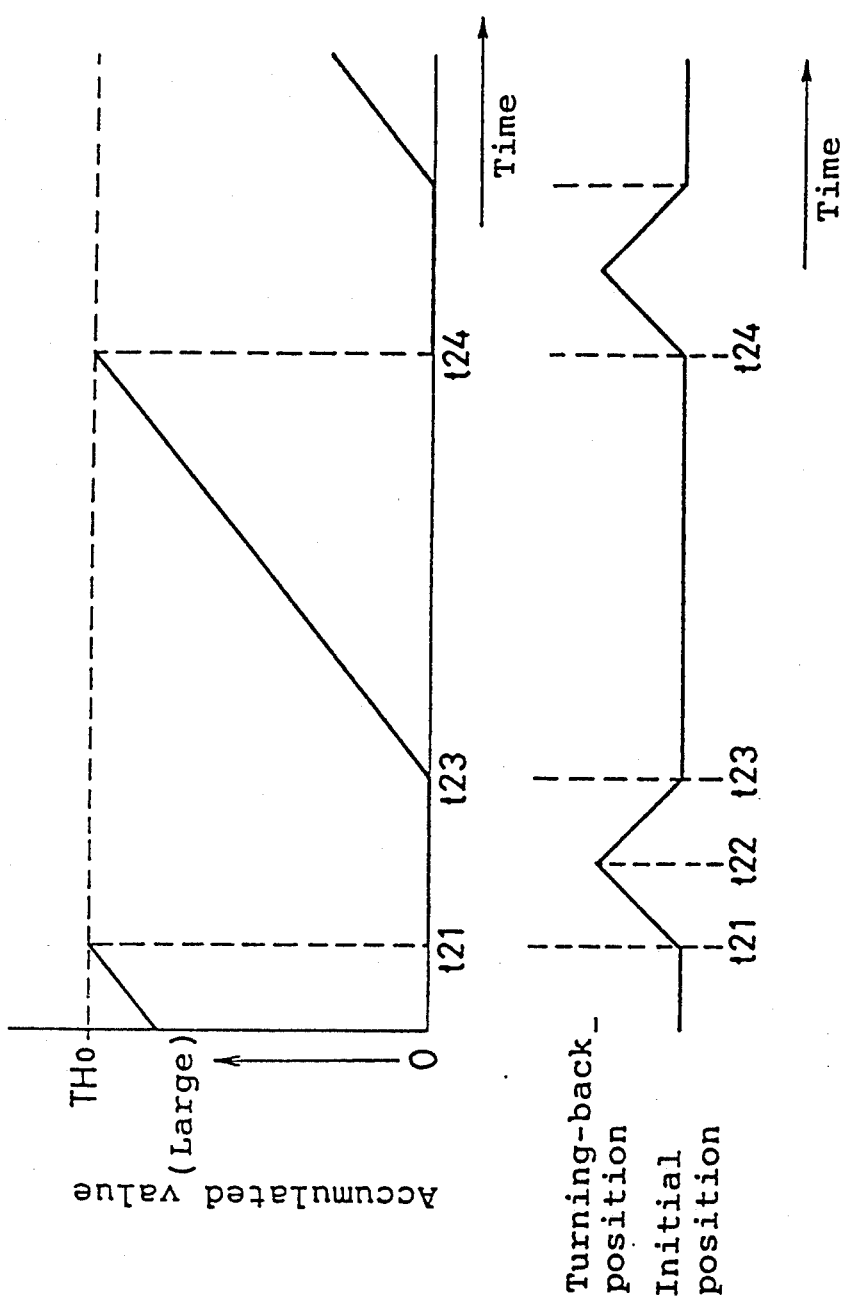
FIGS. 2(1)–2(2) timing charts for explaining the movements of another windshield wiper control apparatus of the prior art, by which at the same time as the wiping action is terminated, the detected signal o the rain sensor is calculated.
Figure 3:
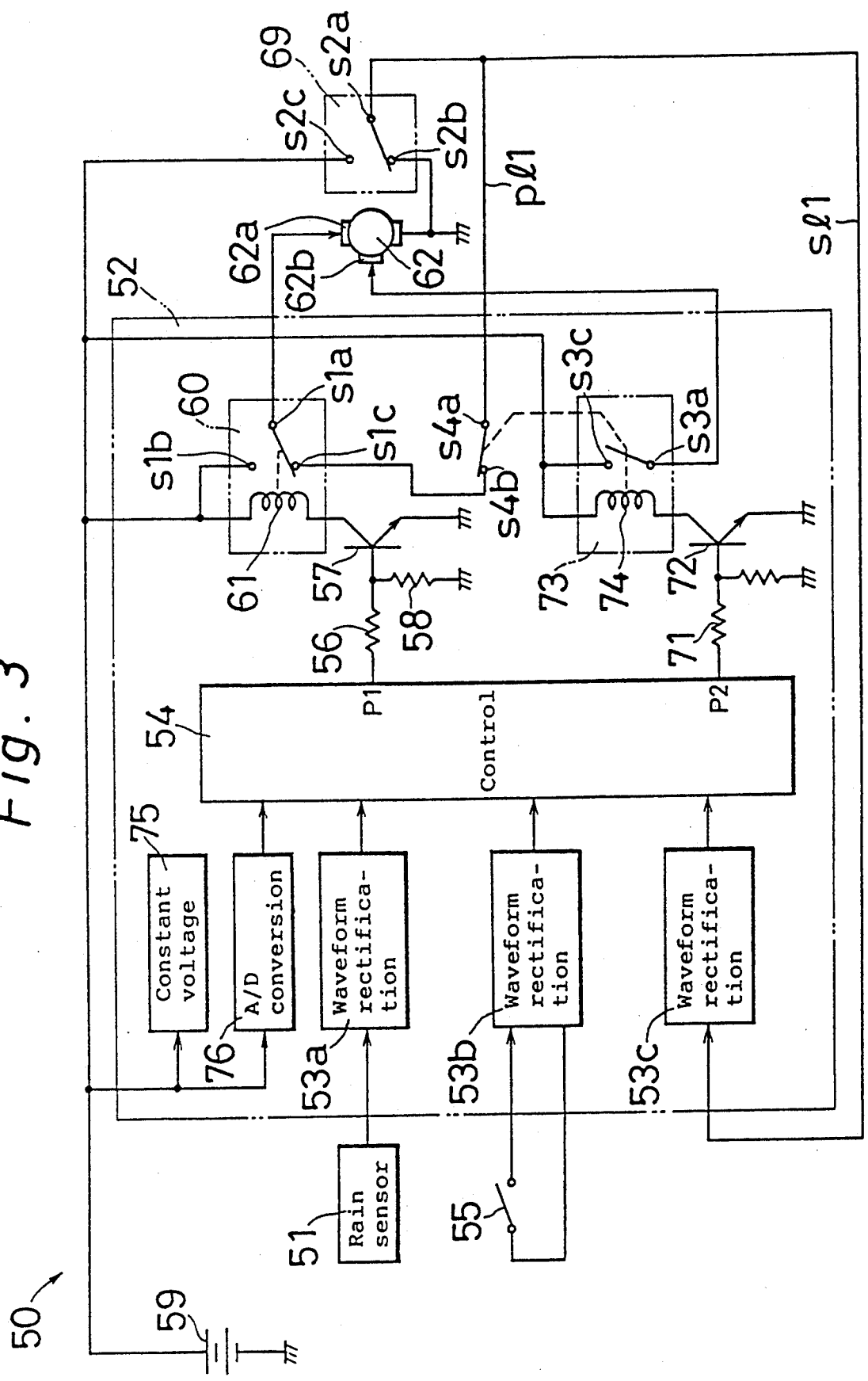
FIG. 3 is an electrical circuit diagram of a windshield wiper control apparatus 50 according to one embodiment of the present invention.

Referring now to the drawings attached herewith, some of the preferred embodiments of the invention are described in detail;

FIG. 3 is an electrical circuit diagram of a windshield wiper control apparatus 50 according to one embodiment of the present invention. This embodiment relates to a so-called automatic windshield wiper control apparatus in which the level of precipitation is detected by a rain sensor 51 and the wiper operation can be controlled on the basis of the level of detected precipitation. The rain sensor 51 is, for example, so composed that a light emitting element and a light receiving element are arranged opposite each other, therefore, the level of precipitation can be detected by calculating the number of raindrops which pass between the light emitting element and the light receiving element. An output signal of the rain sensor 51 is fed to a waveform rectification circuit 53a of a wiper control circuit 52, and is converted to a detected signal having a pulse width proportionate to the level of precipitation, and is fed to the control circuit 54 composed of a microcomputer or the like.

A wiper switch 55 is, for example, installed in a dashboard of a vehicle or in a combination switch installed in the vicinity of the steering wheel of the vehicle. When the wiper switch 55 is turned on, the wiper operation described hereinafter is started. An output of the wiper switch 55 is fed to the control circuit 54 as a wiper switch signal after noise components such as chattering or the like is eliminated in a waveform rectification circuit 53b.

The control circuit 54 sets an action state of the wiper according to the detected signal of the rain sensor 51 and the wiper switch signal of the wiper switch 55. That is, if the level of precipitation is low, the action state of the wiper is an intermittent action state. As the level of precipitation is increased, the period of intermittent action is shortened. Then, when the level of precipitation exceeds a predetermined value, a constant low speed action state is set. When the level of precipitation is further increased and exceeds, another predetermined value, the wiper is placed in constant high speed action state, thereby causing an automatic wiper operation to be realized.

Firstly, the case in which the wiper is controlled from the intermittent state to the constant low speed action state is described below; As the wiper switch 55 is turned on, the control circuit 54 outputs a wiper drive signal of a high level from the output terminal P1. This wiper drive signal is impressed to the base of a transistor 57 via a resistor 56, and the transistor 57 is turned on. Also, a resistor 58 is provided for biasing the transistor 57. As the transistor 57 is turned on, an excitation current flows from a battery 59 installed in the vehicle through an excitation coil 61 of a relay 60, thereby causing a common contact s1a of the relay 60 to contact an individual contact s1b.

As a result, the battery 59 voltage is supplied to an input terminal 62a for low speed action of a wiper motor 62 via the individual contact s1b and the common contact s1a, thereby causing the wiper to be activated.

A constant voltage circuit 75 is a circuit in which the voltage supplied from the battery 59 is converted to the voltage to be used in the wiper control circuit 52. In addition, an A/D conversion circuit 76 converts the voltage level of the battery 59 to a digital value and feeds it to the control circuit 59.

Figure 4:
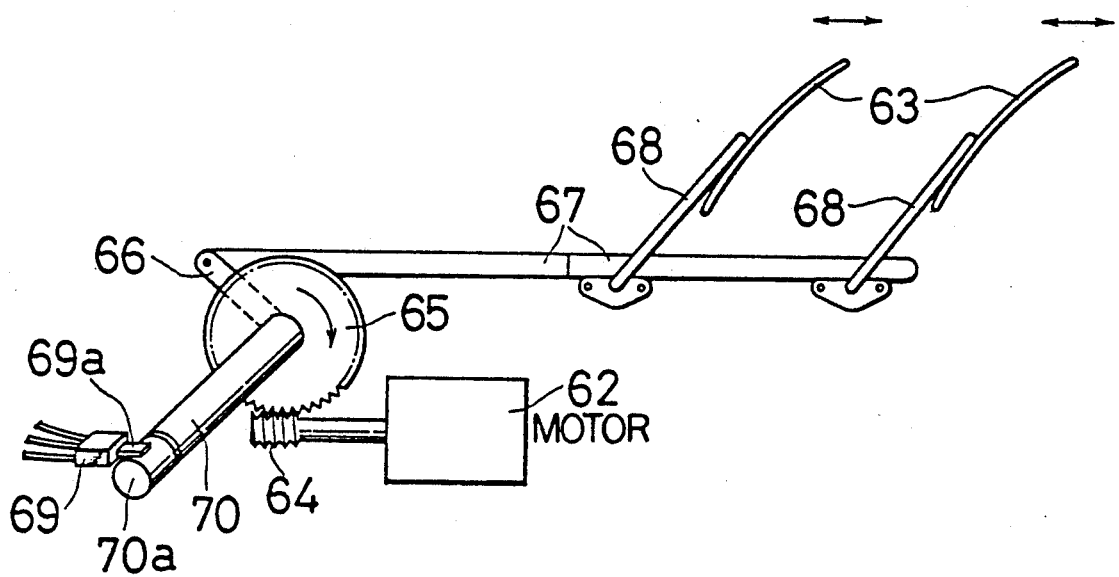
FIG. 4 is a view for explaining the relationship between the wiper motor 62 and wiper blades 63.

Here, the action of the wiper blade is simply explained. FIG. 4 is a view for explaining the relationship between the wiper motor 62 and wiper blades 63. The wiper motor 62 is, for instance, a direct current motor. A worm gear 64 is formed at an output axis of the motor 62. The worm gear 64 is engaged with a worm wheel 65, and a crank arm 66 is fixed to a center axis of the worm wheel 65. A wiper link 67 is connected to the other end of the crank arm 66 under such a condition that the wiper link 67 is movable. Besides, the wiper link 67 is connected to wiper arms 68, and the wiper blades 63 are mounted at the tip ends of the wiper arms 68. In such a composition as described above, as the output axis of the wiper motor 62 rotates, the worm wheel 65 rotates in the direction shown by an arrow and the wiper link 67 is displaced in the right and left direction in FIG. 4. As a result, the wiper blades 63 swing in the direction shown by an arrow and wipe off water droplets or the like which attach to an exterior surface of a windshield.

A cam axis 70 is fixed to the center axis of the worm wheel 65, and a contact piece 69a of a cam switch 69 which detects the wiping position o the wiper blades 63 is brought into contact with the cam 70a of the cam axis 70. The contact piece 69a is displaced vertically by rotation of the cam axis 70, thereby causing a connective state of the cam switch 69 to be changed. Thus, the connective state of the cam switch 69 becomes just as shown in the Table 1 below;

TABLE 1

| Area | First area | Second area |
| --- | --- | --- |
| Rotary angle | 0° to 30° | 30° to 360° |
| Connective contact | s2a and s2b | s2a and s2c |

In the table 1, the rotary angle means the rotary angle of the worm wheel 65, and the rotary angle 0° means that the wiper link 67 shifts to the most right side, namely the wiper blade 63 is housed in a housing position.

Again returning to FIG. 3, the electrical potential of a common contact s2a of the cam switch 69 is inputted to a waveform rectification circuit 53c by way of signal line s11 while the wiper blades 63 are in action, and is fed to the control circuit 54 after noise components such as chattering are eliminated. That is, the control circuit 54 can detect the action status of the wiper blades 63.

In the period during which the wiper drive signal is being output from the output terminal P1 of the control circuit 54, the transistor 57 is turned on. Therefore, the battery 59 voltage is supplied to the wiper motor 62 via the relay 60.

When the worm wheel 65 further rotates and reaches the second area, the common contact s2a of the cam switch 69 connects to an individual contact s2c. Then, the cam signal on the signal line s11 changes from a low level to high level. When the cam signal changes from low level to a high level, the control circuit 54 demagnetizes the excitation coil 61 by changing the wiper drive signal output from the output terminal P1 to a low level, thereby turning off the transistor 57. As a result, when the common contact s1a of the relay 60 is connected to contact s1c, the power is supplied to the wiper motor 62 by way of the battery 59, the contacts s2c, and s2a, a power line P11, contacts s4a, s4b, s1c and s1a and the input terminal 62a in this order, thereby causing the wiper motor 62 to constantly move the wiper blades 63 while the worm wheel 65 is rotating in the second area. When the cam 70a returns to the first area from the second area, the common contact s2a of the cam switch 69 connects to the contact s2b, thereby causing the wiper motor 62 to come to a stop.

Next, the case in which the wiper blades 63 are controlled under a continuous high speed action is described below. The continuous high speed action of the wiper blade 63 is effected by supplying the power to a terminal 62b of the wiper motor 62. Namely, when a wiper drive signal of a high level is impressed to the base of a transistor 72 from an output terminal P2 of the control circuit 54 by way of a resistor 71, the transistor 72 is turned on, thereby causing an excitation coil 74 of a relay 73 to be excited. When the excitation coil 74 is excited, a contact s3a of the relay 73 is connected to a contact s3c, thereby causing the battery 59 voltage to be supplied to the input terminal 62b for high speed action of the wiper motor 62.

Furthermore, when the excitation coil 74 is excited, the contact s4a is disconnected from the contact s4b.

The relationship between the action position of the wiper blades 63 and water droplets attached to the front of the windshield which is the exterior surface of a windshield is explained below referring to FIGS. 5(1)–5(2). FIG. 5 (1) shows a state just after the wiper operation initiates, and the wiper blade 63 which is located at the initial position 63a begins to move in the direction shown by an arrow Y1. Water droplets 81 attach to the front windshield between the wiper blade 63 located at the initial position and the wiper blade 63 located at a turning-back position. As water droplets 81 are eliminated by the wiping action of the wiper blade 63, an accumulated value of the detected signal of the rain sensor in the period during which these water droplets 81 are attaching to the front windshield is unrelated to the wiping action during the next time period.

Next, FIG. 5 (2) shows the way along which the wiper blade 63 returns form the turning-back position 63b back to the initial position 63a, and an arrow Y2 shows a shifting direction of the wiper blade 63. Under this condition, as water droplets 82 which attach between the wiper blade 63 and the initial position 63a are wiped off when the wiper blade 63 returns back to the initial position 63a, the accumulated value of the rain sensor in the period during which the water droplets attach is unrelated to the wiping action in the next time period as well as in FIG. 5 (1).

However, since new water droplets 83 which attach after the wiper blade 63 has wiped off the water droplets are those which will have attached until such the next wiping action is initiated, it is necessary to accumulatively calculate the detected signal of the rain sensor in the period during which the water droplets 83 attach.

Namely, a period during which water droplets which influence the wiping action of the next time period attach starts at the point of time at which the wiper blade passes through the turning-back position. Therefore, it is possible to accurately prescribe the amount of water droplets attached to the front windshield, by accumulatively calculating the amount on the basis of the detected signal of the rain sensor from just after the wiper blade has passed through the turning-back position thereof.

The operation of one embodiment of the windshield wiper control apparatus 50 composed as described above is explained with regard to FIGS. 6(1)–6(2).

FIG. 6 (1) shows variations of the accumulated value on the basis of the detected signal of the rain sensor 51 in the control circuit 54 with respect to time, and FIG. 6 (2) shows varations of the action position of the wiper blade 63 during the same time span.

At time t1 when the accumulated value according to the detected signal of the rain sensor 51 is increased and reaches a threshold value TH, the control circuit 54 outputs the wiper drive signal to the transistor 57, thereby causing the wiping action of the wiper blade 63 to be started, and the control circuit 54 does not calculate the detected signal of the rain sensor 51 during the period of a time W12 form the initial position 63a to the turning-back position 63b of the wiper blades 63. The control circuit 54 begins counting from time t2 when the wiper blades 63 reache the turning-back position 63b. However, the control circuit 54 does not use the detected signal of the rain sensor as is, in the period of a time W23 up to time t3 at which the wiper blades 63 returns to the initial position 63a, but it accumulatively calculates a value obtained by multiplying the detected signal by a certain coefficient.

As for this coefficient, it is necessary to accumulatively calculate the water droplets 83 attached to the windshield after the wiping action of the wiper blade 63 for the period of the time W23 as described above, and since the amount of water droplets which attach to the front windshield is roughly equivalent to half of the sum of the detected signals of the rain sensor 51, it is proper that 0.5 is chosen as the coefficient. In this embodiment, the time of reciprocation of the wiper blades can be almost represented by the wiper drive voltage, by detecting the wiper drive voltage, one could determine when the wiper blade 63 has reached the turning-back position. Namely, according to FIG. 7 which is a graph showing the relationship between the wiper drive voltage and the time of wiper reciprocation, the relationship between the wiper drive voltage supplied to the wiper motor 62 and the time for which the wiper blade 63 reciprocate on the front windshield is determined. The wiper drive voltage supplied to the wiper motor 62 is converted to a digital value by the A/D conversion circuit 76, and the control circuit 54 determines the time t2 on which the wiper blade reaches the turning-back position.

Also in this embodiment, the turning-back position of the wiper blade is determined by detecting the wiper drive voltage. However, the action position of the wiper arm 68 can be directly detected by other means, for example, a potentiometer or the like.

Figure 8:
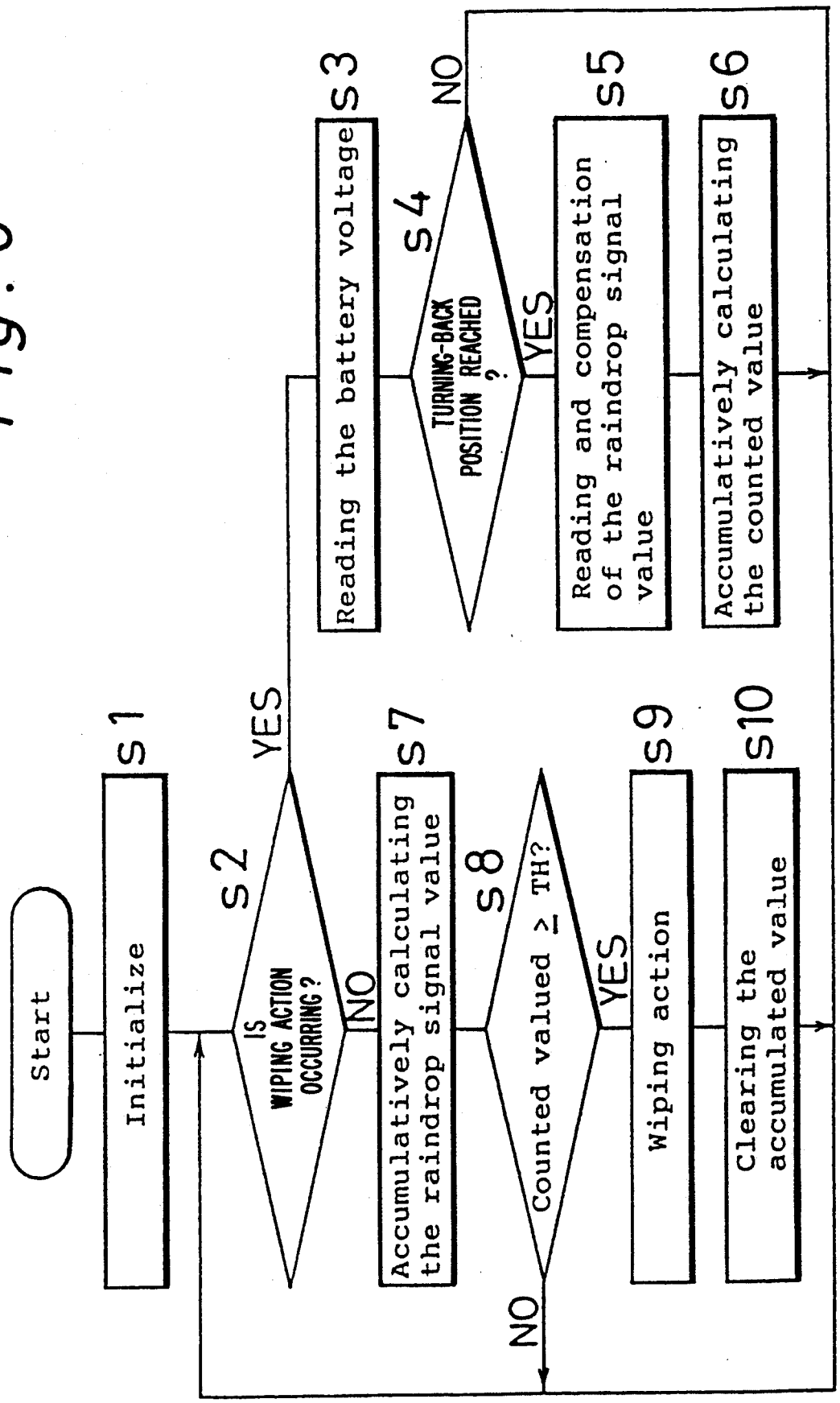
FIG. 8 is a flowchart for explaining the wiper operation shown in FIGS. 6(1)–6(2)

Next, the processing conducted in the control circuit 54 is explained with regard to the flowchart shown in FIG. 8. In the ensuing specification, the processing from the time t1 at which the wiping action initiates is explained one step after another, excepting a step s1.

In the step s1, such initializing clearing the memory areas and resetting flags is carried out. In a step s2, a determination is made as to whether or not the wiping action is occurring. Namely, when the wiper drive signal is output from the control circuit 54 to the transistor 57 of the drive circuit or the common contact s2a of the cam switch 69 is at a high level, it is determined that the wiping action is occurring. Just after the wiping action initiates, the processing proceeds from the step s2 to a step s3, and the battery voltage to be supplied to the wiper motor 62 is read from the output of the A/D conversion circuit 76. In a step s4, a determination is made as to whether or not the wiper blade 63 has reached the turning-back position 63b. Namely, the time of reciprocation of the wiper blade is determined from the battery voltage which is read in the step s3, and a determination is made as to whether or not the time counted from the starting of the wiper blade exceeds the time necessary for the wiper blade 63 to reach the turning-back position 63b. In the case that the time does not exceed the time to reach the turning-back position, the processing returns from the step s4 to the step s2. Thus, the above processing is repeatedly continued until the wiper blade 63 reaches the turning-back position 63b.

When the wiper blade 63 reaches the turning-back position 63b, the processing proceeds from the step s4 to a step s5 wherein the detected signal of the rain sensor 51 is read, and the compensation value can be calculated by multiplying the detected value by the compensation coefficient, for instance 0.5 as described above. In a step s6, the compensated value in the step s5 is accumulatively calculated in a pre-defined memory area of the control circuit 54. In the period of the time W23 for which the wiping action occurs, the processing in the steps s5 and s6 are conducted. Then, the compensation value which is obtained by multiplying the detected signal by the compensation coefficient continues to be accumulatively calculated.

When the time t3 at which the wiping action is terminated is reached, the processing proceeds from the step s2 to a step s7, and the signal value detected from the rain sensor 51 is accumulatively calculated in the predefined memory area as they is. The processing further goes to a step s8 wherein the accumulated value is compared with the predetermined threshold value TH. When the accumulated value has not reached the threshold value TH, the processing returns from the step s8 to the step s2, and the signal value detected from the rain sensor 51 continues to be accumulatively calculated.

When the accumulated value reaches the threshold value TH, the processing proceeds from the step s8 to a step s9, and the wiper drive signal to activate the wiper blade is outputted for the transistor 57. In a step s10, the accumulated value is cleared out at the same time as the wiper drive signal is outputted.

Thus, the detected signal of the rain sensor 51 is not calculated for the time W12 from the initial position 63a to the turning-back position 63b in the wiping action of the wiper blades 63, and the detected signal is calculated for the time W23 from the turning-back position 63b to the initial position 63a after being multiplied by the predetermined coefficient. Therefore, the total amount of the raindrops attached to the exterior surface of the windshield roughly corresponds to the accumulated value, thereby causing the action timing of the wiper to become in accord with the action timing which a driver wants and causing an optimum wiper control to be realized.

Figure 9:
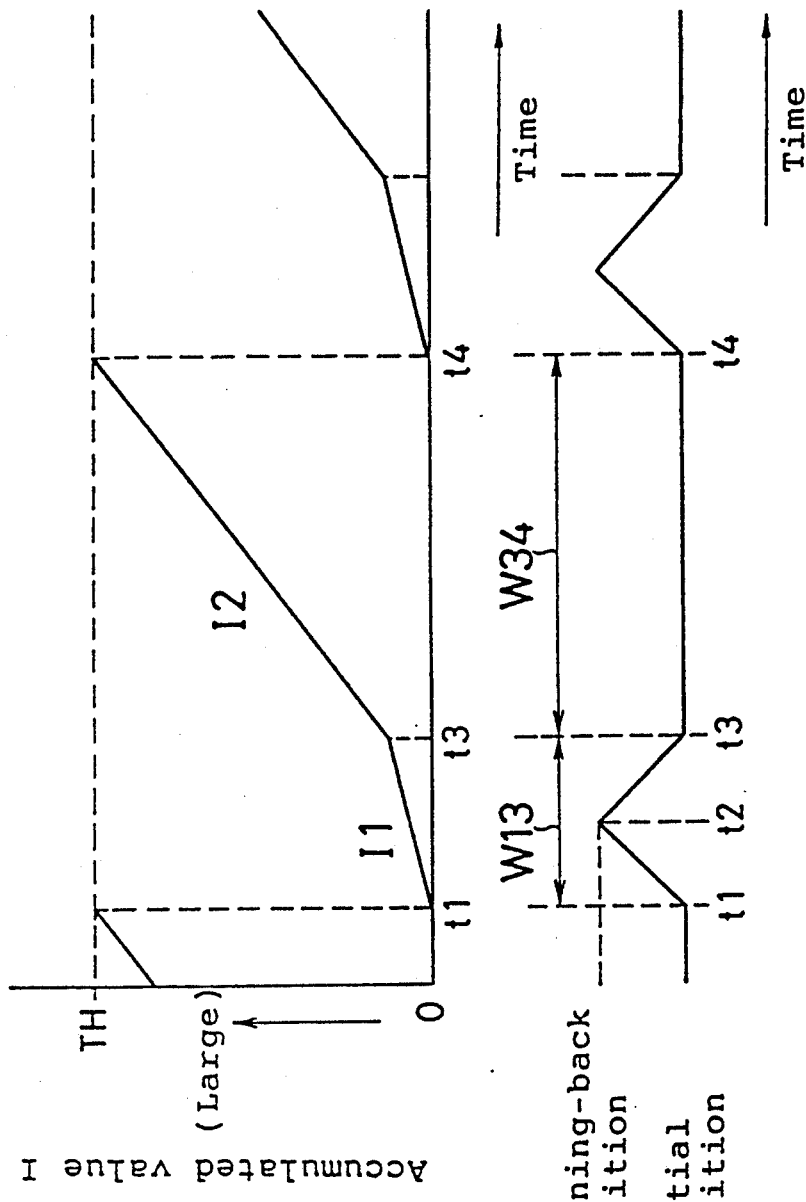
FIGS 9(1)–9(2) are timing charts for explaining the second embodiment of the present invention.

On the other hand, with regard to the wiper blade 63, it is much easier to detect the initial position which is the pause position than to detect the turning-back position. FIGS. 9(1)-9(2) are timing charts for explaining another embodiment of the windshield wiper control apparatus 50. FIG. 9 (1) shows variations of the accumulated value on the basis of the detected signal of the rain sensor 51 in the control circuit 54 with respect to time, and FIG. 9 (2) shows variations of the action position of the wiper blade 63 during the same time span.

At the time when the accumulated value I on the basis of the detected signal of the rain sensor 51 is increased and reaches the threshold value TH, the control circuit 54 outputs a wiper drive signal to the transistor 57 to cause the wiping action of the wiper blade 63 to be started. At the same time, after the accumulated value I of the detected signal of the rain sensor 51 is cleared in the control circuit 54, the accumulatively calculating is started again. In this embodiment, in the period W13 from the time t1 to the time t3 which the wiper blade again returns to the pause position, which is the initial position, via the time t2 at which the wiper blade passes through the turning-back position 63b, the detected signal of the rain sensor 51 is not calculated as is, but the value obtained by multiplying the detected signal by a predetermined coefficient is accumulatively calculated.

Namely, it is necessary to calculate only the raindrops which attach after the wiping action of the wiper blade 63 in the period W13 as described above, and since the amount of raindrops which attach as described above is roughly equivalent to one-fourth of the total sum of the detected signals of the rain sensor calculated in the period W13, one-fourth ($\frac{1}{4}$) is selected as the above coefficient, and the value obtained by multiplying by the above coefficient is measured as the first accumulated value I1.

The time intermittency is started from the time t3, and the wiper blade is in pause at the pause position. Therefore, the detected signal of the rain sensor is accumulatively calculated from the time t3 as is, to cause the second accumulated value I2 to be measured. The value added together with the first accumulated value T1 is handled as the accumulated value I necessary for the subsequent wiping action. Namely, the value obtained by calculating the detected signals of the rain sensor in the period W34 started from the time t3 in FIGS. 9(1)-9(1) is the second accumulated value I2. Then, this second accumulated value I2 is added to the first accumulated value I1 measured in the period W13 one after another. The time W34 is continued until the time t4 when the accumulated value I of sum exceeds the threshold value TH. Thereafter, the accumulated value I is cleared at the time t4 as well as at the time t1, to cause the wiping action to be carried out and subsequent calculating action to be started. Also, in this embodiment, the explanation has been made, assuming that the activation speed of the wiper blades is constant and the level of the precipitation is constant, too.

Figure 10:
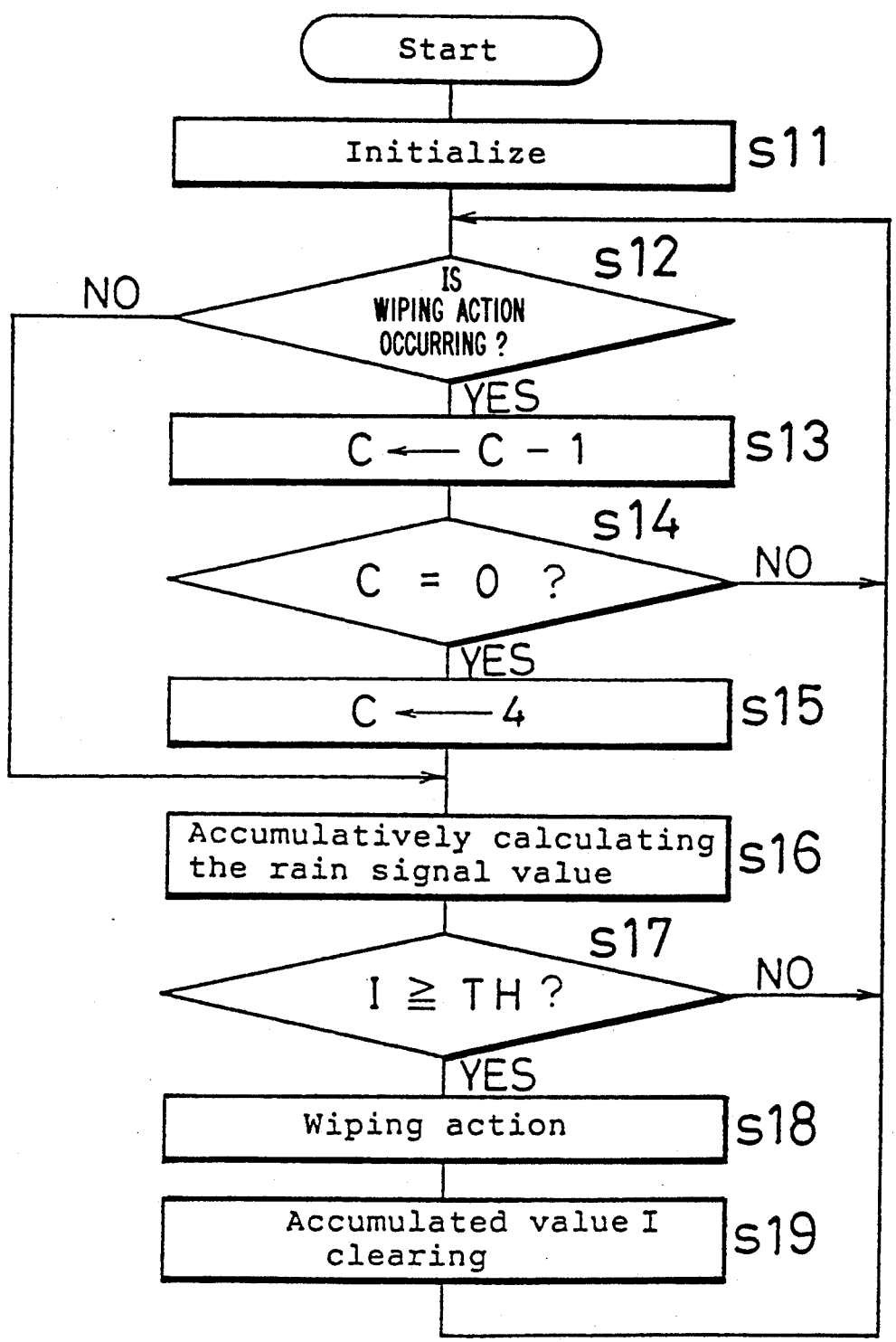
FIG. 10 is a flowchart for explaining the wiper operation shown in FIGS. 9(1)–9(2)

Next, the processing to be conducted in the control circuit 54 is explained in conjunction with the flowchart shown in FIG. 10. In the following explanation, the processing from the time t1 at which the wiping action is started is explained one step after another, excepting a step s11.

In the step s11, initializing such as clearing the memory areas and resetting the flags is conducted. In a step s12, a determination is made as to whether or not the wiper blade 63 is in a wiping action. Namely, a determination is made as to whether or not the common contact s2a of the cam switch 69 is at a high level. Currently, since it has just after the wiping action is started, the processing proceeds from the step s12 to a step s13, to cause the value of a predetermined timing counter C to be reduced by only 1 and renewed. In a step s14, a determination is made as to whether or not the timing counter C is 0. When the determination is negative, the processing returns to the step s12, and the above processing is repeated. When the determination is positive, the processing proceeds to a step s15 to cause a constant 4 to be set in the timing counter C. Then, the processing proceeds to a step s16.

In the step s16, the detected signal form the raindrop sensor is accumulatively calculated, and a determination is made as to whether or not the accumulated value I calculated in a step s17 exceeds the predetermined threshold value TH. When the accumulated value I is less than the threshold value TH, the processing returns to steps s12 again, and the step s12 to s17 are repeated.

During the above noted processing, since the determination in the above step s12 becomes negative when the wiping action of the wiper blade is terminated, the processing proceeds from the step s12 to the step s16. The processing repeats steps s12, s16 and s17 until the accumulated value I exceeds the threshold value TH.

Namely, the processing does not proceed to step s16 until the constant 4 set in the timing counter C in the step s15 reaches 0 in the step S14 does not proceed the step s16. In other words, unless the processing from the step s12 to the step 14 are carried out four times, the processing does not proceed to the step s16. Therefore, the timing at which the detected signal of the rain sensor 51 is calculated while the wiper blades 63 are in a wiping action is equivalent to one-fourth of the timing of calculating the detected signal of the rain sensor 51 when the wiper blades 63 are in pause. So, the first accumulated value I1 calculated by way of the steps s12 through s17 is the same as the result obtained by multiplying the second accumulated value by the constant of ¼ (one-fourth), in comparison with the second accumulated value I2 calculated by way of the steps s12, s16 and s17.

Thereafter, when the accumulated value I exceeds the threshold value TH in the step s17, the processing proceeds to a step s18 to cause a subsequent wiping action to be started. Furthermore, the accumulated value I is cleared in a step s19. Again, the processing returns to the step s12 to cause the above noted action to be repeated.

Therefore, according to the above embodiment, since the accumulated value I necessary for subsequent wiping actions is calculated according to the first accumulated value I1 counted on the basis of the output from the rain sensor 51 while the wiper blade 63 is in the wiping action thereof and the second accumulated value I2 counted on the basis of the output from the rain sensor 51 when the wiper blade is in pause, it is possible to rpescribe the amount of precipitation attached to the exterior surface of a windshield, and the timing of starting the wiping action is roughly in accord with the timing at which a driver wants to activate the wiper blade, thereby causing an optimized wiper control of to be realized.

Also in this embodiment, the first embodiment value is explained according to such a composition that it can be multiplied by the constant of ¼ (one-fourth) in comparison with the second accumulated value. However, such a composition as the first accumulated value can be directly calculated and the second accumulated value can be measured by being multiplied by a constant of four times, by setting a predetermined threshold value to four times times its original value.

Also, an output shown in FIG. 11 (1) is output from the rain sensor 51 every time that a raindrop passes through it and is inputted to the waveform rectification circuit 53a of the wiper control circuit 52. The waveform rectification circuit 53a discriminates the output from the rain sensor 51 shown in FIG. 11 (1) by a predetermined level l31, and output the detected signal of low level as is shown in FIG. 11 (2), for only a period Ws for which the output is more than this discrimination level l31, and feeds the detected signal to the control circuit 54.

On the other hand, the sensitivity of the rain sensor 51 is shown in FIG. 12. The smaller the diameter of raindrop becomes when the diameter of raindrop is smaller than an appointed value l32, the more than the sensitivity of the rain sensor 51 is lowered. When the diameter of raindrop is more than l32, it is possible to acquire a sensor sensitivity which roughly corresponds to the diameter of raindrop.

The control circuit 54 accumulatively calculates the period Ws for which the detected signal shown in FIG. 11 (2) is being output and outputs the wiper drive signal at the point of time when the accumulated value exceeds the predetermined threshold value. At this time, the control circuit 54 can change the threshold value according to whether or not the period Ws for which the detected signal shown in FIG. 11 (2) exceeds a predetermined period T.

Namely, when the diameter of the raindrop 5 are large and the output of the rain sensor 51 is large as that shown by solid lines in FIG. 11 (1), the period Ws for which this output exceeds the discrimination level l31 becomes longer. On the contrary, when the diameter of raindrops are small like drizzles and the output of the rain sensor 51 is small as shown by a imaginary lines in FIG. 11 (1), this period Ws becomes shorter.

However, as explained in the description of the prior art, when the diameter or raindrop becomes somewhat small, a driver feels delay of action for the wiping action corresponding to the level of precipitation and it will become difficult to secure the visibility of a driver. Therefore, in this embodiment, when an accumulated value $\Sigma Wa$ of the period Ws exceeds the first predetermined threshold value T1 when the period Ws is less than the predetermined period T, the wiper blade begins wiping actions. At the point of time when an accumulated value $\Sigma Wb$ of the period Ws becomes more than a threshold value T2 which is greater than the first predetermined threshold value T1 in the case that the period Ws of the detected signal is longer than the predetermined period T, the wiper blade begins wiping action.

Figure 13:
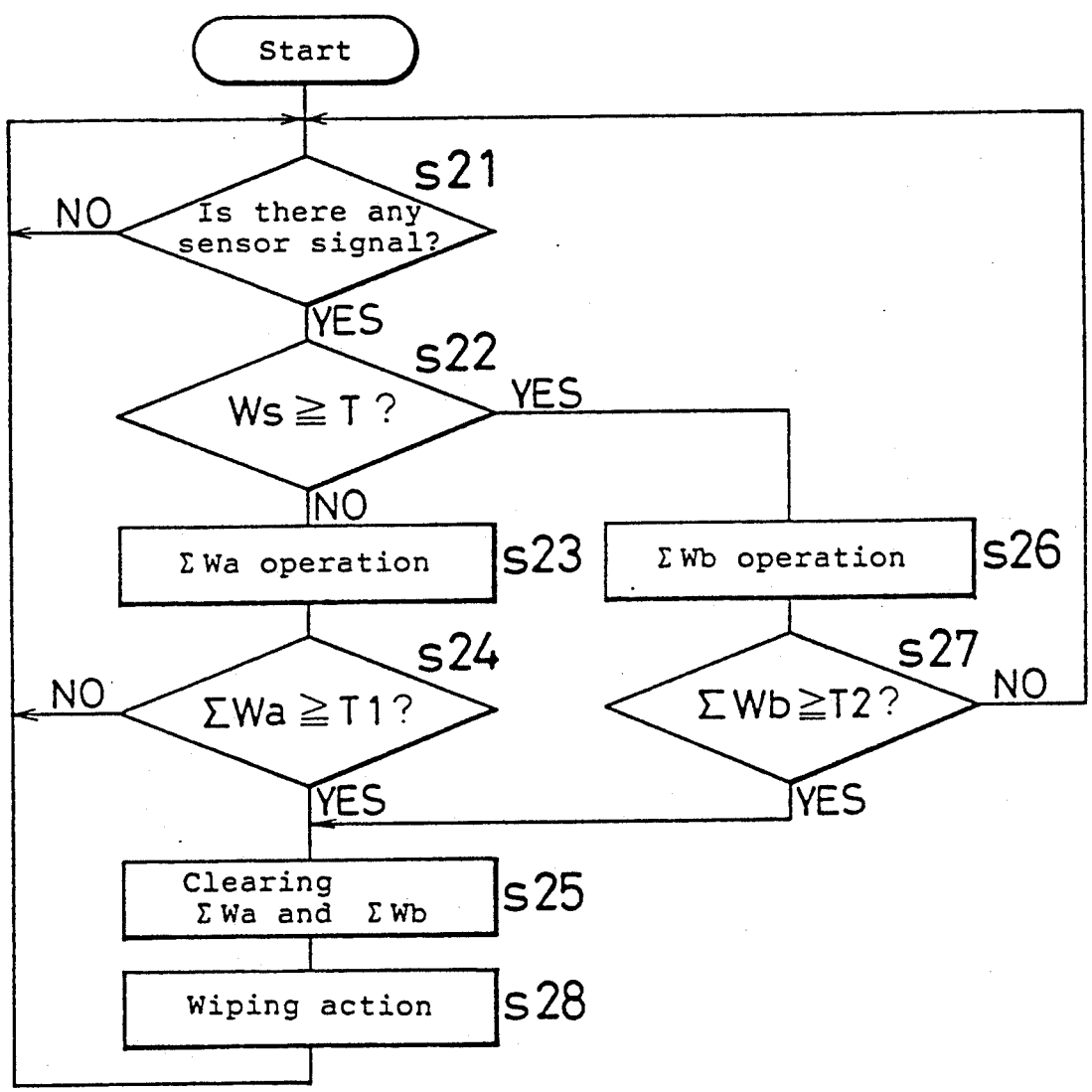
FIG. 13 is a flowchart for explaining the third embodiment of the present invention.

FIG. 13 is a flowchart for explaining the action. In a step s21, a determination is made as to whether or not the detected signal is output from the rain sensor 51, that is, is there precipitation. When there's no precipitation, this step s21 is repeated. When the detected signal is output, the processing proceeds to a step s22, wherein a determination is made as to whether or not the period Ws for which the detected signal is being output exceeds the predetermined period T. When it is not, namely when the diameter of raindrops are smaller, the processing proceeds to a step s23. In this step s23, the accumulated value $\Sigma Wa$ of the period Ws is counted, and a determination is made in a step s24 as to whether or not this accumulated value exceeds the first predetermined threshold value T1. When it does not, the processing returns to the step s21. When it does the processing proceeds further to a step s25.

In the step s22, when the period Ws of the detected signal is more than the predetermined period T, the processing proceeds to a step s26, wherein the accumulated value $\Sigma Wb$ of the period is counted. Then, the processing proceeds to a step s27, and a determination is made as to whether or not the accumulated value $\Sigma Wb$ exceeds the second predetermined threshold T2. When it does not, the processing returns to the step s21. When it does, the processing proceeds to the step s25.

In the step s25, the accumulated values ΣWa and ΣWb are reset. In a step s28, the wiping action is conducted by the wiper blade. The, the processing returns to the step s21.

Figure 14:
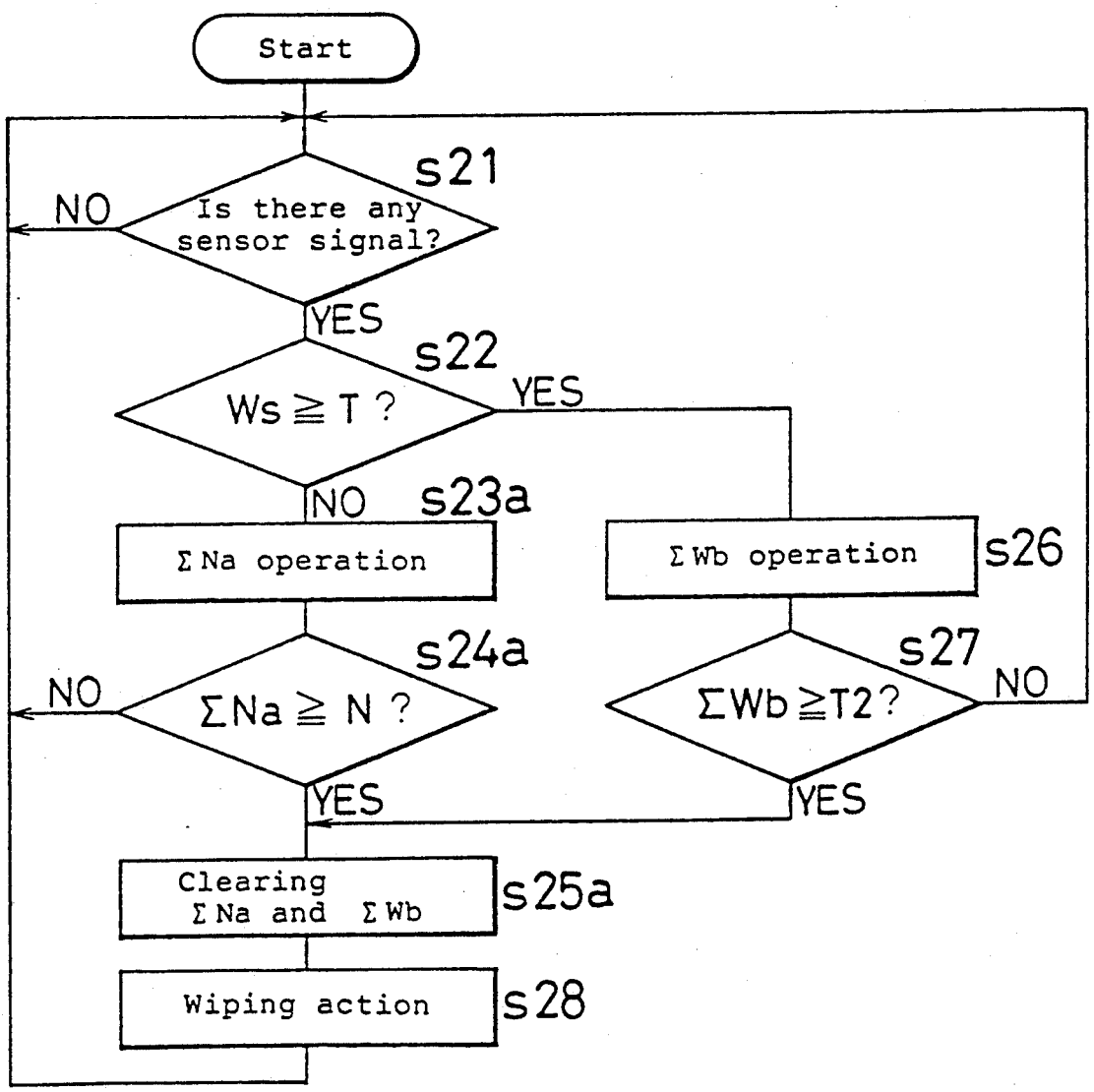
FIG. 14 is a flowchart for explaining the forth embodiment of the present invention.

FIG. 14 is a flowchart for explaining action of another embodiment of the invention, and this embodiment is similar to the embodiment shown in FIG. 13. All of the components which correspond to those in the embodiment of FIG. 13 are given the same reference number. In this embodiment, the processing proceeds to a step s23 when the period Ws of the detected signal in a step s22 is less than the predetermined period T, and regardless of the diameter of raindrops, an accumulated value ΣNa of the number of raindrops detected by the rain sensor 51 is obtained. In a step s24a, a determination is made as to whether or not the accumulated value ΣN is more than a predetermined value N. When it does not, the processing returns to the step s21. When it does, the processing proceeds to a step s25a. In the step s25a, the accumulated value ΣNa and ΣWb are reset, and the processing further proceeds to the step s28. Furthermore, as shown in FIG. 12 mentioned above, the windshield wiper control apparatus can be adaptive to the raindrops, which is the small size, whereby it is difficult to secure the linearity between the diameter of the raindrop and the sensor sensitivity.

Figure 15:
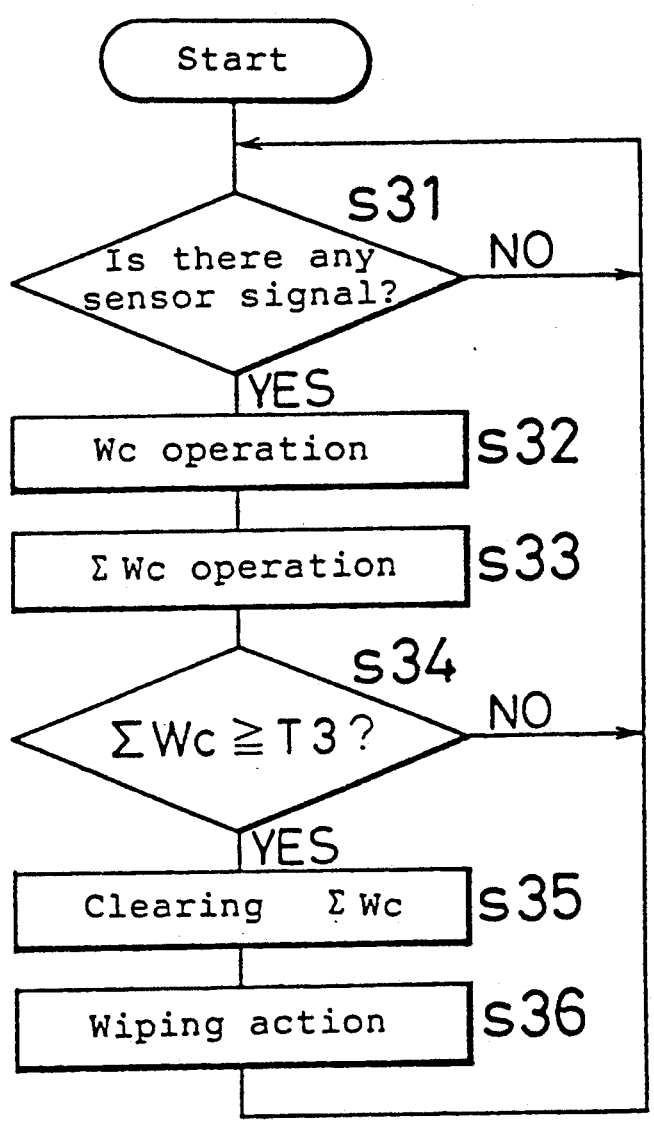
FIG. 15 is a flowchart for explaining the fifth embodiment of the present invention.

FIG. 15 is a flow charts for explaining action of still another embodiment of the invention. In the embodiments shown in FIG. 13 and FIG. 14, respectively, two threshold values T1 or N and T2 are selected, corresponding to the period Ws for which the detected signal is being output, i.e., the diameter of raindrops. However, in this embodiment, the period Ws of the detected signal is compensated for and operated in accordance with the curve shown in FIG. 16. A determination is made, on the basis of whether or not the accumulated value ΣWc of the result of the operation is more than a predetermined threshold T3, as to whether or not the wiper blade is being driven.

A compensated value $\alpha$ which is used in the compensation operation is so selected that it can become smaller as the period Ws of the detected signal becomes longer and that it can become very large as the period Ws becomes shorter. Namely, the compensated value $\alpha$ is set so as to correspond to the sensitivity of the rain sensor 51 shown in FIG. 12, and is pre-stored as a curve in the control circuit 54. The wiper blade is driven as shown below, using this compensated value $\alpha$.

Figure 16:
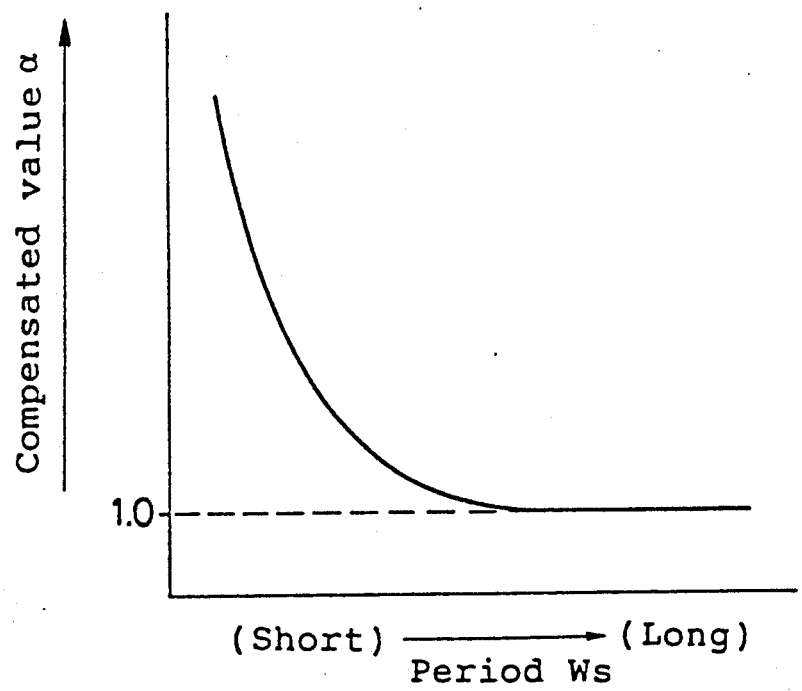
FIG. 16 is a graph showing the relationship between the period of detection Ws of the rain sensor 51 to be used in the embodiment shown in FIG. 15 and the compensation coefficient thereof.

In step s31, a determination is made as to whether or not the detected signal is output from the rain sensor 51. When it is not, this step s31 is repeated. When the detected signal is inputted from the rain sensor 51, the processing proceeds to a step s32. In this step s32, the compensated value $\alpha$ shown in FIG. 16 is read out, corresponding to the period Ws for which the detected signal is output, and a compensated detection period WC is obtained by operation with Wc=ΣWs. In a step s33, an accumulated value ΣWC of the detection period Wc, which has been obtained by compensation and operation in the step s32, is operated upon.

In a step s34, a determination is made as to whether or not this accumulated value ΣWc is more than the predetermined threshold T3. When it is not, the processing returns to the step s31. When it is, the processing proceeds to a step s35. The accumulated value Wc is reset in the step s35. After the wiping action is carried out in a step s36, the processing returns to the step s31.

Thus, in the windshield wiper control apparatus 50 according to the present invention, two threshold values are provided to discriminate the accumulated values ΣWa or ΣNa and ΣWb of the detected signal of the rain sensor 51 by the level thereof, corresponding to the size of the raindrops, and these threshold values T1 or N and T2 are selectively used, corresponding to the size of the raindrops, alternatively the period Ws for which the detected signal is being led out is compensated for according to the size of the raindrops, thereby causing the wiper blade to be driven in accordance with the accumulated value Wc of the result of the compensation. Therefore, the wiper can be driven at an optimal wiping interval without occurrence of any delay even though small raindrops, such as drizzles, rain droplets and dusty particles splashed over by a preceding vehicle attach to the exterior surface of a windshield, and the visibility of a driver can be securely obtained. In addition, the wiping action can be carried out at the optimal interval which is in accord with that which a driver wants, thereby causing an optimum wiping action to be conducted.

Consecutively, an initial action just after the wiper switch 55 is operated is explained below;

FIGS. 17(1)-17(4) are timing charts for explaining the action of the wiper blade 63 in the case that the wiper switch 55 is turned on when the wiper blade 63 is located in the first area, and FIGS. 18(1)-18(4) are also timing charts for explaining the action of the wiper blade 63 in the case that the wiper switch 55 is turned on when the wiper blade 63 is located in the second area. Firstly, the action of the wiper blade in the case that the wiper blade 63 is located in the first area when the wiper switch 55 is turned on is explained below; FIG. 17 (1) shows an operating state of the wiper switch 55, FIG. 15 (2) shows an outputting state of the cam switch signal which are outputted from the cam switch 69, FIG. 15 (3) shows an outputting state of wiper drive signal which are outputted from the output terminal P1 of the control circuit 54, and FIG. (4) does a drive state of the wiper blade 63, respectively.

When the wiper switch 55 is turned ON from OFF at time t31 as shown in FIG. 17 (1), the wiper drive signal of high level is outputted from the output terminal P1 as shown in FIG. 17 (3). As a result, as shown in FIG. 17 (4), the wiper blade 63 initiates action thereof. And as shown in FIG. 17 (3), when time t32 for expressing that the cam switch signal has shifted from the first area to the second area comes, the wiper drive signal which is outputted from the output terminal P1 changes to a low level. On the other side, this action is continued in the period during which the wiper blade 63 is wiping off. Then, when time t33 at which the wiper blade 63 shifts from the second area to the first area is reached, the wiper blade 63 comes to a stop.

Next, the action of wiper blade 63 in the case that the wiper blade 63 is located in the second area when the wiper switch 55 is turned on is explained below; FIGS. 18 (1) through (4) express signals similar to those in FIGS. 17 (1) through (4). As shown in FIG. 18 (1), when the wiper switch 55 is turned on at time t34, the wiper drive signal of a high level is outputted from the output terminal P1 as shown in FIG. 18 (3). As a result, the wiper blade 63 initiates the wiping action as shown in FIG. 18 (4). In the control circuit 54, even though the cam switch signal from the cam switch 69 expresses that the wiper blade 63 has shifted from the second area to the first area at time t35, the wiper drive signal which is outputted form the output terminal P1 is kept at a high level. When time t36 at which the wiper blade 63 shifts from the first area to the second area is reached, the wiper drive signal changes to a low level. However, as the common contact s2a of the cam switch 69 is connected to the individual contact s2c, the wiper blade 63 continuously carries out the wiping action in the second area and comes to a stop at a time t37 at which the wiper blade 63 shifts from the second area to the first area.

Figure 19:
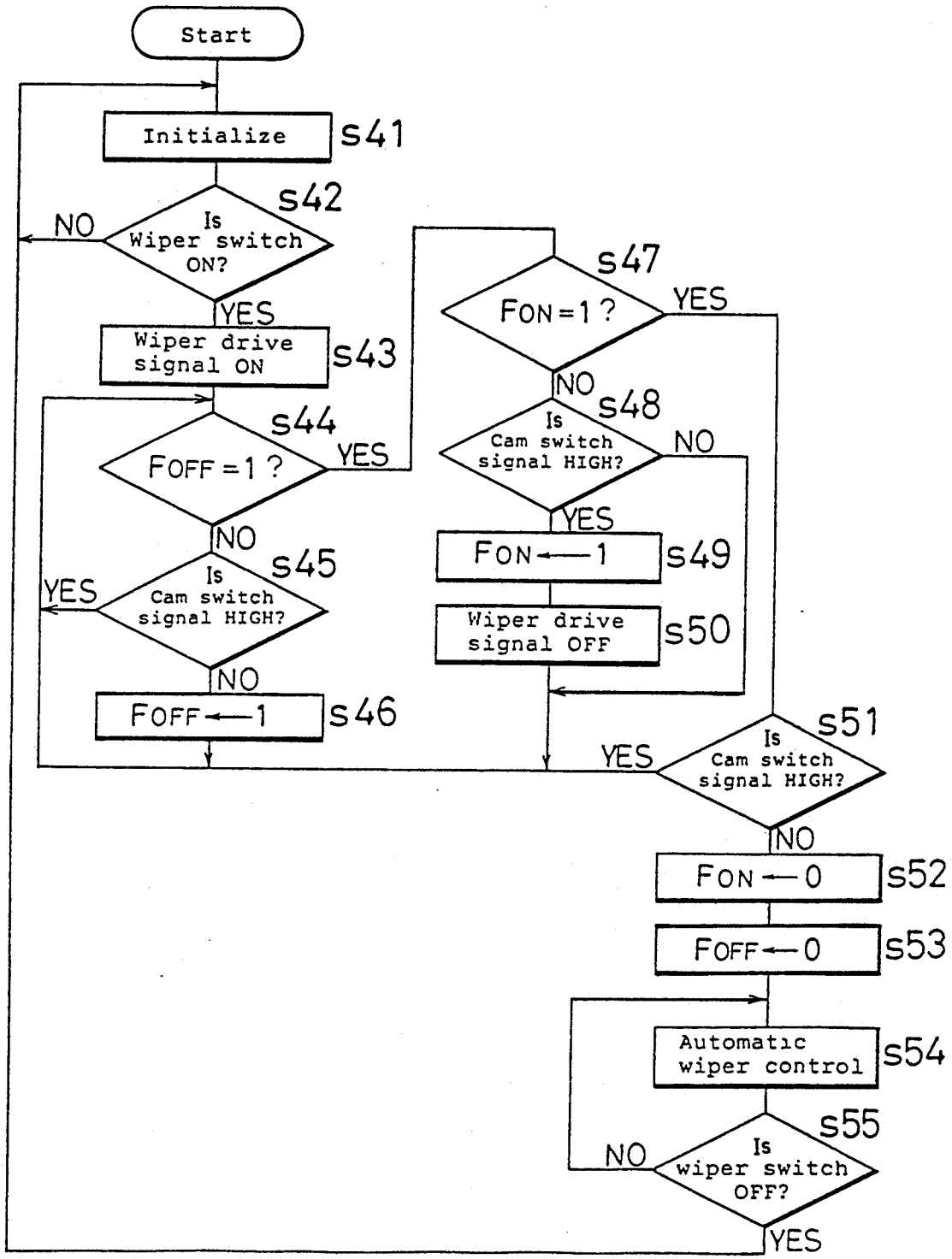
FIG. 19 is a flowcharts for explaining the action of the control circuit 54 by which the initial action is carried out.

FIG. 19 is a flowchart for explaining the action of the control circuit 54 by which the initial action is carried out. When the control circuit 54 starts operating, the initializing is carried out in a step s41. This initializing includes clearing the random access memory (RAM) in the control circuit 54, initializing the output terminals, and clearing a cam switch OFF flag $F_{OFF}$ and a cam switch ON flag $F_{ON}$, which are used in the flowchart explained herebelow. After the initializing is carried out, a determination is made in step s42 as to whether or not the wiper switch 55 is turned on. When it is turned on, the processing proceeds to a step s43.

In a step s43, the wiper drive signal of a high level is outputted from the output terminal P1, and the wiping action is initiated by the wiper blade 63. In a step s44, a determination is made as to whether or not the cam switch OFF flag $F_{OFF}$ is set to 1. Since the cam switch OFF flag $F_{OFF}$ is cleared in the initializing of the step s41 when the step s44 is initially effected, the proceeding proceeds to a step s45. In this step s45, a determination is made as to whether or not the cam switch signal from the cam switch 69 is at a high level, i.e., which of, the first or the second areas the wiper blade 63 is located. Since the cam switch signal is at a low level when the wiper blade 63 is located in the first area, the processing proceeds to a step s46, and cam switch OFF is set to a1 flag $F_{OFF}$. In the step s45, when the cam switch signal is at a high level, that is, when the wiper blade 63 is located in the second area, the processing proceeds to the step s44, and the steps s44, s45 and s46 are repeatedly carried out until the wiper blade 63 returns to the first area.

When a determination is made in the step s44, cam switch OFF is equal to a flag $F_{OFF}$, the processing proceeds to a step s47 wherein determination is made as to whether or not the cam switch ON is set to a1 flag $F_{ON}$. As the cam switch ON flag $F_{ON}$ is cleared during the initializing steps s41, when step s47 is initially carried out, the processing proceeds to a step s48, wherein a determination is made as to whether or not the cam switch signal is at high level. Since the cam switch signal is at a low level when the wiper blade 63 moves in the first area, the processing returns from the step s48 to the step s44. When the wiper blade 63 shifts from the first area to the second area, the cam switch is changed from a low level to a high level. Then, in the control circuit 54, the processing proceeds from the step s48 to a step s49. In the step s49, the cam switch ON is set to a1 flag $F_{ON}$. In a step s50, the wiper drive signal of a high level, which is outputted from the output terminal P1, is set to a low level. Since common contact s2c of the cam switch 69 is connected to individual contact s2c, even though the output terminal P1 changes to a low level in the step s50, the wiper motor 62 is still driven.

In the step s49, when 1 is set at the cam switch ON is set to a1 flag $F_{ON}$, is set to a1 the processing proceeds from the step s47 to a step s51, wherein whether or not the cam switch signal is at a high level. A determination is made as to the cam switch signal is at a high level while the wiper blade 63 is continuously carrying out the wiping action in the second area, the processing returns from the step s51 to the step s44. After that, when the wiper blade 63 shifts from the second area to the first area, the cam switch signal changes to a low level, and the processing proceeds from the step s51 to a step s52. In the step s52, the cam switch ON flag $F_{ON}$ is cleared. In a step s53, the cam switch OFF flag $F_{OFF}$ is cleared. Through the above processing, the initial action is completed.

When the initial action is terminated, the processing proceeds to a step s54, and the windshield wiper control apparatus 50 selects the action state o the wiper on the basis of the output signal from the rain sensor 51 and outputs the wiper drive signal from either the output terminal P1 or the output terminal P2, thereby causing the automatic wiper control to be accomplished. In step s55 a determination is made as to whether or not the wiper switch 55 is OFF. When that the wiper switch 55 is in ON, the automatic wiper control in the step s54 is continued. When the wiper switch is turned OFF, the processing returns from the step s55 to the step s41 to cause the wiper control to come to a stop.

Also, though in this embodiment a cam switch 69 is used as a sensor for detecting the wiping position o the wiper blade 63, the sensor is not necessarily limited to this cam switch, and an angle sensor for detecting the rotary angle of the worm wheel 65 or a rotary encoder may be used.

Therefore, when the wiper switch 55 is thus turned on, the wiping action (the initial action) can be carried out at least once even though the wiper blade 63 is located in either the first area or the second area. Therefore, it is easy for a driver to determine whether or not the action of the windshield wiper control apparatus 50 is normal.

Figure 20:
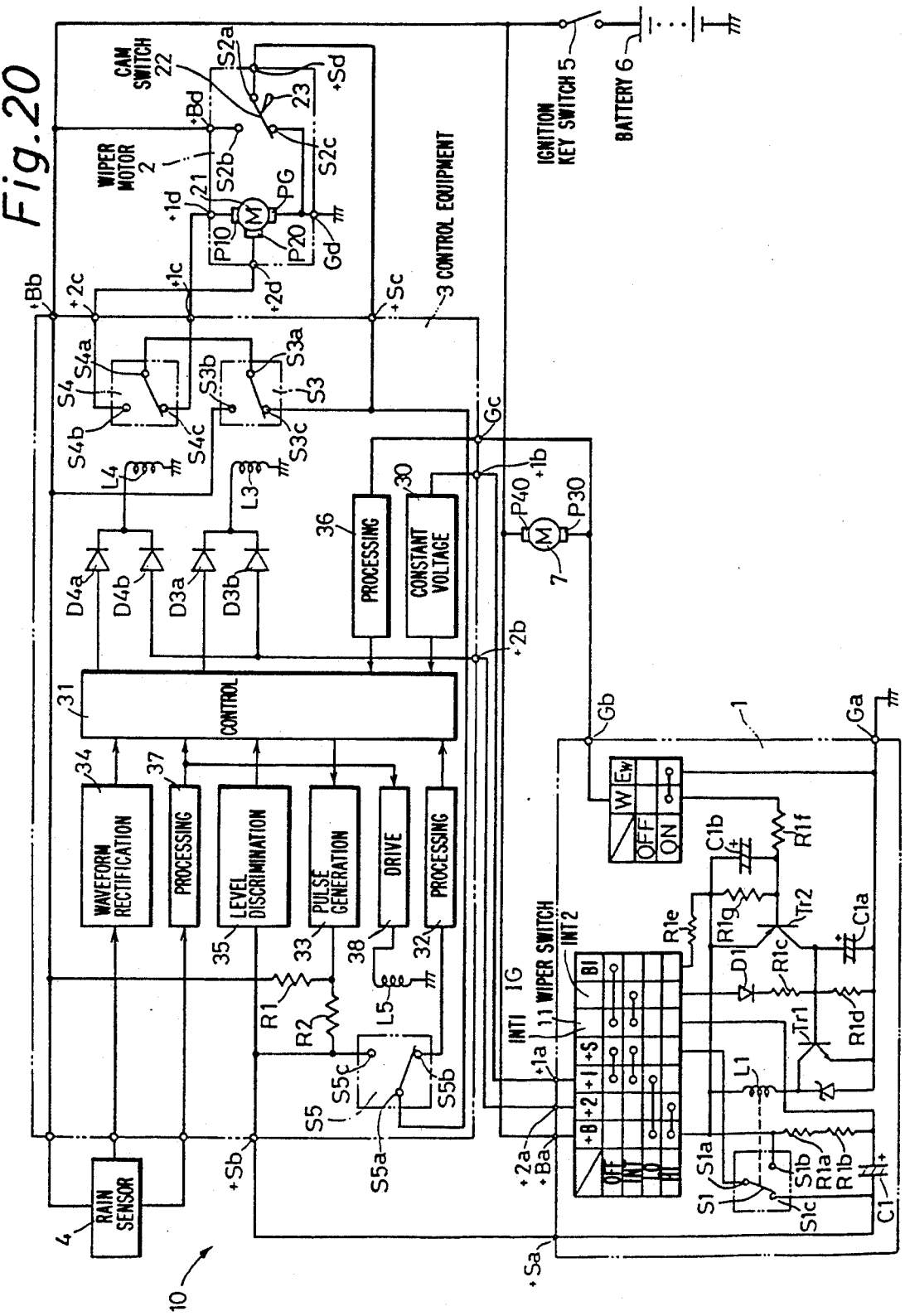
FIG. 20 is a block diagram showing the electrical construction of a windshield wiper control apparatus 10 according to another embodiment of the present invention.

FIG. 20 is a block diagrammatic view showing the electrical construction of a windshield wiper control apparatus 10 according to another embodiment of the invention. Since control equipment 3, which is the second control means, is placed between an existing switch circuit 1 which is the first control means and a wiper motor 2, when a wiper switch 11 is set to the INT mode which is the intermittent mode, the wiper blade can be driven at the wiping interval corresponding to the level of precipitation detected by a rain sensor 4, thereby causing an automatic wiper operation to be realized.

Therefore, in the previous windshield wiper control apparatus not having any automatic wiper operation, a terminal +1d to be connected to a power input terminal P10 for low speed operation of the motor 21 of the wiper motor 2 is connected to a terminal +1a of the switch circuit 1, a terminal +2d to be connected to a power input terminal P20 for high speed operation is connected to a terminal +2a of the switch circuit 1, and a terminal +Sd to be connected to a common contact S2a of a cam switch 22 is connected to a terminal +Sa of the switch circuit 1.

The switch circuit 1 is so composed that the wiper switch 11, a washer switch 12 and circuits to be connected to these switches 11 and 12 are arranged on a printed circuit board, and respective potentials of the terminals +Sa, +2a and +1a change, corresponding to a setting mode of the wiper switch 11. Power is supplied to a terminal +Ba from a battery 6 through a ignition key switch 5, and a terminal Ga is grounded.

Four action modes such as OFF, INT, LO and HI can be set by the wiper switch 11. When set in the OFF mode, the wiper operation is forced to be a pause mode. When set in the INT mode which is a second action mode, the wiper blade can driven at a wiping interval corresponding to the level of precipitation. When set in a LO mode a HI mode, which are respectively a first action mode, the wiper blade is continuously driven at a low speed in the case of a LO mode or at a high speed in the case of a HI mode.

In FIG. 20, the wiper switch 11 shows a connected state of its contacts in the respective action modes. Namely, in the OFF mode, contacts +1 and +S are connected to each other. At the same time, contacts INT1 and B1 are connected to each other, too. In the INT mode, the contacts +1 and +S are connected to each other. At the same time, contacts INT1 and INT2 are connected to each other too. In the LO mode, contacts +B and +1 are connected to each other. In the HI mode, contacts +B and +2 are connected to each other.

When the wiper switch 11 is in the OFF mode the, voltage IG of the battery 6 which is by way of the ignition switch 5 is fed to a constant voltage circuit 30 in the control equipment 3 by way of a terminal +Bb, resistors R1 and R2, terminals +Sb and +Sa, contacts S1c, S1a, +S and +1 terminals +1a and +1b in this order. However, under this condition, power enough to energy-charge a control circuit 31 in order to effect the automatic wiper control operation can not be supplied due to current limitation of the resistors R2 and R1. Therefore, the control circuit 31 remains in pause.

In the OFF mode, when the voltage IG is fed to one terminal of the capacitor C1 by way of the resistors R1 and R2 and is also fed to the other terminal of the capacitor by way of the resistors R1a and R1b used to set the intermittent time and by way of another resistor R1e, which is connected to the resistors R1a and R1b in parallel and whose resistance value is smaller than a synthetic resistance value of the resistors R1a and R1b, the capacitor C1 discharges electricity.

Therefore, when the wiper switch 11 is set to the INT mode, the capacitor C1a is electrically charged by way of the contacts INT1 and INT2, a diode D1 and a resistor R1c in this order, and after the capacitor C1a is fully electrically charged, the voltage between the terminals exceeds a predetermined value, thereby causing a transistor Tr1 to be turned on.

A relay coil L1 is then energized to cause a relay switch S1 to be changed over, and the voltage IG is supplied to the constant voltage circuit 30 by way of the terminal +Ba, the contacts S1b, S1a, +S and +1, and the terminals +1a and +1b in this order. Since the control circuit 31 is thus power-charged, it can detect the switching state of the wiper switch 11 as described hereinafter. When the wiper switch 11 is in the INT mode, the wiper switch 11 can effect the automatic wiper control operation in accordance with the output from the rain sensor 4 by way of a waveform rectification circuit 34.

Also, the resistor R1e is connected to the resistors R1b and R1a in parallel in the OFF mode as described above, thereby causing the time constant to be made small. Therefore, as in the case where the setting mode of the wiper switch 11 has been changed in the order of INT-OFF-INT, the capacitor C1 can be rapidly electrically charged even after it has been discharged, thereby causing the control circuit 31 to quickly enter the standby state.

On the other hand, when the washer switch 12 is set to the ON mode, contacts W and EW are connected to each other. One terminal P30 of a washer motor 7 is grounded by way of a terminal Gb, the contacts W and EW and another terminal Ga in this order. Also, the other terminal P40 is fed the voltage from the battery 6 via the ignition key switch 5. Thus, the washer motor 7 rotates and the washer liquid is discharged by a pump driven by the washer motor 7.

At this time, the charging current flows to a capacitor C1b via the path consisting of the terminal +Ba, the contact +B, the capacitor C1b, a resistor R1f, the contacts W and EW and the terminal Ga in this order. Since the voltage across the capacitor C1b exceeds a predetermined value, the base potential of a transistor Tr2 is lowered to cause the transistor Tr2 to be turned on. Since the charging of the capacitor C1a is started and the capacitor C1a is fully energy-charged, the transistor Tr1 is turned on to cause the relay coil L1 to be energized, thereby causing the control circuit 31 to be power-charged.

Then, when the washer switch 12 is changed from the ON mode to the OFF mode, the capacitor C1b is electrically discharged with the time constant of a resistor R1g. When the voltage across the capacitor C1b is lowered to less than the predetermined value, the transistor Tr2 is turned off. The discharging of the capacitor C1a with the time constant of a resistor R1d then started. When the voltage across the capacitor C1a is lowered to less than the predetermined value, the transistor Tr1 is turned off. In addition, as explained below, the sum of the time constant of the resistor R1g and the time constant of the resistor R1d is set to a period W1 for which the wiper blade can be reciprocated at least three times after starting the power charging of the control circuit 31 and judging that the washer is interlocked.

The output of the control circuit 31 in the automatic wiper operation is fed to relay coils L3 and L4, respectively, through diodes D3a and D4a. Namely, when the wiper is activated a low speed, the relay coil L3 is energized and the relay coil L4 is de-energized. The power is supplied from the battery 6 to the power input terminal P10 for low speed operation of the motor 21 by way of the terminal +Bb, contacts S3b, S3a, S4a and S4c, and the terminals +1c, and +1d in this order. Also, when the wiper is activated a high speed, both the relay coils L3 and L4 are energized, and the power is supplied to the power input terminal P20 for high speed operation of the motor 21. Furthermore, when the wiper is in the intermittent mode, both the relay coils L3 and L4 are de-energized.

When the wiper switch 11 is set to the LO mode, the voltage IG is fed to the constant voltage circuit 30 by way of the terminal +Ba, the contacts +B and +1, and the terminals +1a and +1b in this order. The control circuit 31 is power-charged and the switching state of the wiper switch 11 is detected as described hereinafter. When in the LO mode, the relay coil L3 is kept being energized 30 that the motor 21 is continuously driven at a low speed.

When the wiper switch 11 is set to the HI mode, no power is supplied to the constant voltage circuit 30 to cause the control circuit 31 to be in a pause. However, the power is supplied to both the relay coils L3 and L4 by way of the terminal +Ba, the contacts +B and +2, the terminals +2a and +2b, and diodes D3b and D4b in this order, and both the relay coils L3 and L4 are energized to cause the power to be supplied from the battery 6 to the power input terminal P2 for high speed operation of the motor 21 by way of the terminal +Bb, the contacts S3b, S3a, S4a and S4b, and the terminals +2c and +2d in this order.

The wiper motor 2 is so composed that it can integrally include the motor 21 and the cam switch 22. A cam 23 of the cam switch 22 rotates, corresponding to the wiping position of the wiper blade. At the stop position of the motor 21, in which the wiper blade is in pause, a common contact S2a of the cam switch 22 is connected to an individual contact S2c. Therefore, a terminal +Sc of the control equipment 3 is connected to a terminal Gd which is connected to a grounding terminal PG of the motor 21, by way of a terminal +Sd and the contacts S2a and S2c, and the terminal +Sc is sued as grounding potential point. In the case that the cam switch 22 rotates for instance more than 30 degrees, the common contact S2a is connected to an individual contact S2b. Therefore, the voltage IG of the battery 6 to be supplied to a terminal +Bd is output from the terminal S2a.

The potential of the terminal +Sc of the control equipment 3 is read in the control circuit 31 from contacts S5a and S5b of a relay switch S5 by way of the processing circuit 32 in the INT mode and the LO mode, and the control circuit 31 energizing keeps the relay coil L3 continuously energized while the wiper blade is in wiping action and returns the wiper blade to Hs pause position.

Also, when the wiper switch 11 is changed to the OFF mode with the wiper blade parted from the pause position, the power supply to the control circuit 31 is interrupted in the INT mode and the LO mode. Therefore, supplying the energizing current to the relay coil L3 by way of the diode D3a is stopped, and, in the HI mode, supplying the energizing current o the relay coils L3 and L4 by way of the diodes D3b and D4b is stopped, thereby causing the common contact S3a of the relay switch S3 to be connected to the individual contact S3c, and the common contact S4a of the relay switch S4 to be connected to the individual contact S4c. Thus, the power is supplied to the power input terminal P10 for low speed operation of the motor 21 until the wiper blade returns to its pause position.

On the other hand, the rain sensor 4 consists of, for example, a pair of light emitting and receiving elements. It is possible to obtain detection outputs corresponding to the level of precipitation due to raindrops passing through the light channel formed between the light emitting and receiving elements, and the detected signal is inputted to the control circuit 31 by way of the waveform rectification circuit 34.

Also, a circuit which can keep light receiving level of the light receiving element in a condition of not detecting any raindrops at a constant value i.e., a circuit for an offset feature, is provided in this rain sensor 4. When dusty particles or stains may attach to a lens placed in the light channel and the detection output from the light receiving elements is lowered, this circuit increases the light emitted from the light emitting elements for effecting the offset feature.

However, when the light channel is completely interrupted due to mud or other dusty particles, it can not be absorbed by the offset feature as shown in the above. For this reason, a fail-safe signal to express that abnormality has occurred is output from the rain sensor 4. This fail-safe signal through a processing circuit 37 is inputted to the control circuit 31 and is fed to a drive circuit 38.

In the case that an abnormality occurs in this rain sensor 4 with the wiper switch 11 set to the INT mode, the drive circuit 38 energizes a relay coil L5, thereby causing the common contact S5a of the relay coil L5 to be connected to an individual contact S5c. Therefore, the potential of the common contact S2a of the cam switch 22 is inputted in the switch circuit 1 by way of the terminals +Sd and +Sc, the contacts S5a and S5c, and the terminals +Sb and +Sa in this order. Also, at this time, the control circuit 31 energizes and de-energizes the relay coil L3 by way of the diode D3a with the intermittent period of time set by the resistors R1a and R1b and the capacitor C1 in the switch circuit 1, thereby causing the intermittent action to be secured.

Thus, when the wiper switch 11 is set to the LO mode and the INT mode, the control circuit 31 is power-charged by way of the constant voltage circuit 30. Therefore, the control circuit 31 detects the switching state of the wiper switch 11 as described below; in the INT mode, the automatic wiper operation can be carried out. In the LO mode, the motor 21 can be continuously driven a low speed.

Figure 21:
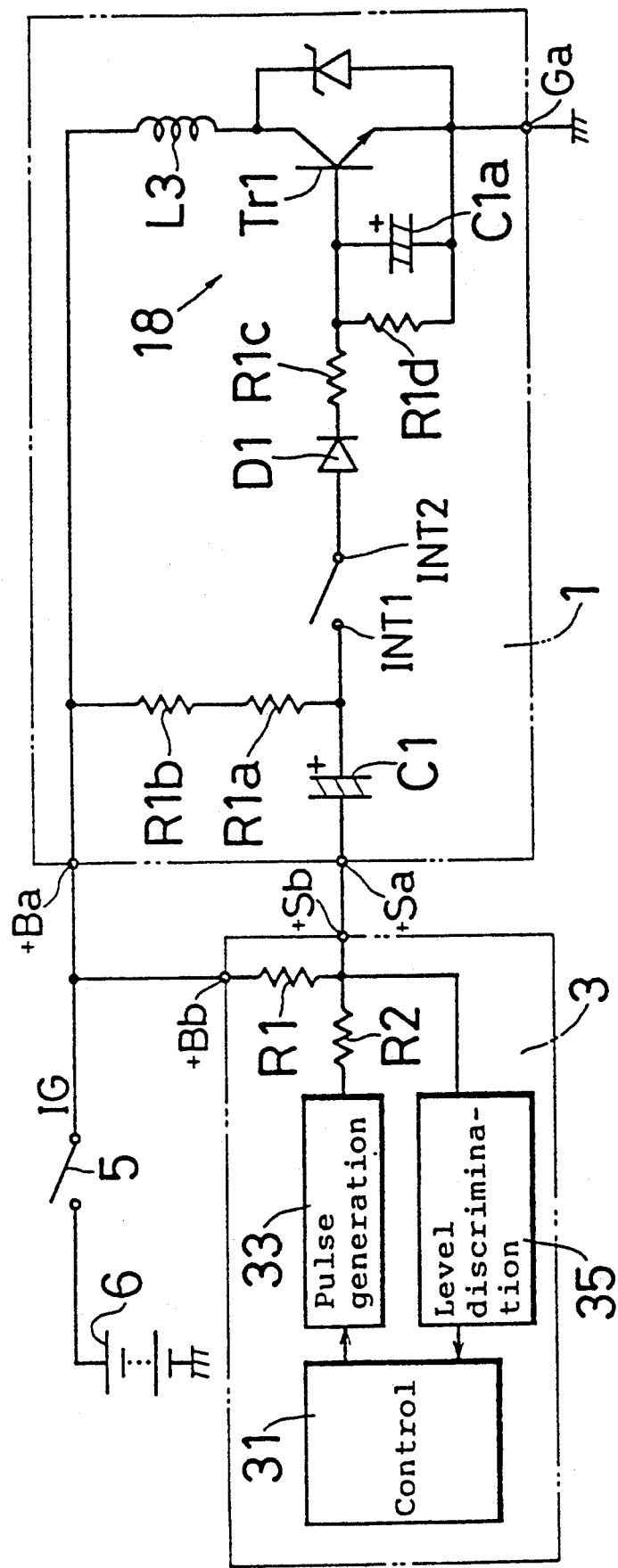
FIG. 21 is a circuit diagram for explaining a state of connection in the switch circuit 1 when the wiper switch 11 is set to INT mode or LO mode.

FIG. 21 is a circuit diagram for explaining the state of connection in the switch circuit 1 when the wiper switch 11 is set to the INT mode or the LO mode. A pulse of low level whose pulse width is, for instance 20 msec. and pulse interval is, for instance, 200 msec. is output from the control circuit 31 as shown in FIG. 22 (1). After the pulse is inverted in a pulse generation circuit 33 which is realized with transistors, etc. as shown in FIG. 22 (2), it is output from the terminal +Sb by way of the resistor R2. This pulse is shunted to a relay drive circuit 18 which consists of the diode D1, the resistors R1c and R1d and the transistor Tr1 or the like, when the contacts INT1 and INT2 of the wiper switch 11 are connected to each other.

Namely, viewing at a standpoint of an alternating signal, when being set to the LO mode, the pulse coming from the pulse generation circuit 33 is voltage- divided by the resistors R2, R1b and R1a as shown in FIG. 23 (1), and appears at the terminal +Sb. In addition, when being set to the INT mode, as shown in FIG. 23 (2), the pulse is voltage-divided by the resistors R2, R1b and R1a and synthetic impedance of the relay drive circuit 18 and appears at the terminal +Sb.

Therefore, in the INT mode, a wave height value VL becomes a small value, for instance, 1 V as shown in FIG. 22 (3). On the contrary, in the LO mode, a wave height value VH becomes a high value, for instance, 3 V as shown in FIG. 22 (4).

It is possible to read the setting mode of the wiper switch 11 by comparing these wave height values VL and VH with a reference voltage $V_{TH}$ predetermined by a level discrimination circuit 35. The level discrimination circuit 35 comprises, for instance, a voltage divider circuit, a comparator, and a reference voltage source. In this voltage divider circuit, the input voltage is divided to, for example, in half or for example, 1.1 V is set as the reference voltage $V_{TH}$.

However, in the washer interlocking mode in which the control circuit 31 has been warmed up by setting the washer switch 12 to the ON mode with the wiper switch 11 set to the OFF mode thereof, the resistor R1e will have been connected in parallel to the resistors R1a and R1b as shown in FIG. 23 (3). Therefore, the wave height value inputted in the level discrimination circuit 35 becomes a low value, and an erroneous judgement may occur in the INT mode.

For this reason, the control equipment 3 detects the potential of one terminal P30 of the washer motor 7 by a processing circuit 31 by way of a terminal Gc. According to the result of the detection, the control circuit 31 determines that the washer is interlocked when the terminal Gc is in low level and the results of the determination of the level discrimination circuit 35 is the INT mode, thereby causing the wiper blade to be reciprocated at least three times.

When the washer interlocking is thus detected, the mode determination by the control circuit 31 is effected in a period W2a, shown in FIG. 24 (3), which is shorter than a period W2 of the usual mode determination shown in FIG. 24 (2).

Namely, as shown in FIG. 24 (1), after the washer switch 12 is turned on at time t01, the transistor Tr1 is turned on at time T02 and the control circuit 31 stands by, the usual mode determination is effected at time t03 which occurs a predetermined period W2 after the determination. As shown with a time W4, it takes about 200 msec. for standby of the control circuit 31, and the period W2 includes a filter treatment time, for instance, 20 msec. which is carried out to eliminate the induction noise of an internal combustion engine.

Therefore, though there is no problem even when the washer interlocking is effected in the LO mode and the HI mode, there is a possibility for the wiper blade to reciprocate only one time when the washer switch 12 is interrupted for a short time as shown with time t04 in the state in which the washer interlocking is effected in the OFF mode. For this reason, when the washer interlocking is detected as shown in the above, the period W2a of determination is shortened, thereby causing such a trouble to be eliminated.

Figure 25:
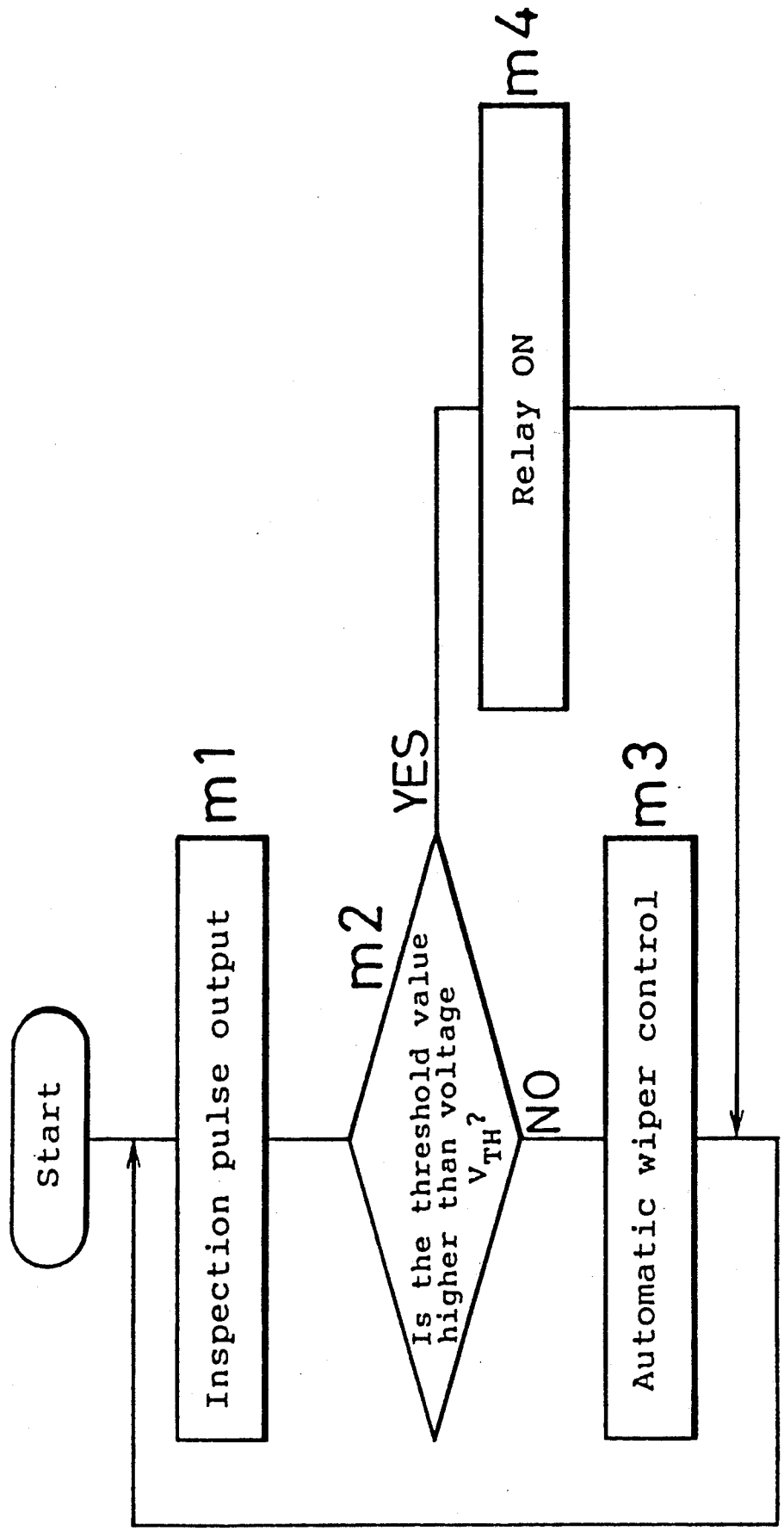
FIG. 25 is a flowchart for explaining the mode judging action of the windshield wiper control apparatus 10.

The mode determination action of the control circuit 31 explained above is summarized as shown in the flowchart of FIG. 25. As the processing of the control circuit 31 starts, the inspection pulse is outputted from the pulse generation circuit 33 in a step m1, in order to determine whether the wiper switch 11 is in the INT mode or in the LO mode. In a step m2, a determination is made as to whether or not the potential of the terminal +Sb is higher than the threshold voltage $V_{TN}$. When the potential is lower than the threshold voltage $V_{TN}$, it is determined that the wiper switch 11 has been set to the INT mode, and the automatic wiper control is carried out in a step m3. When the potential of the terminal +Sb is higher than the threshold voltage $V_{TH}$ in the step m2, it is determined that the wiper switch 11 is set to the LO mode. In a step m4, the relay coil L3 is continuously energized to cause the motor 21 to be driven a low speed.

Figure 26:
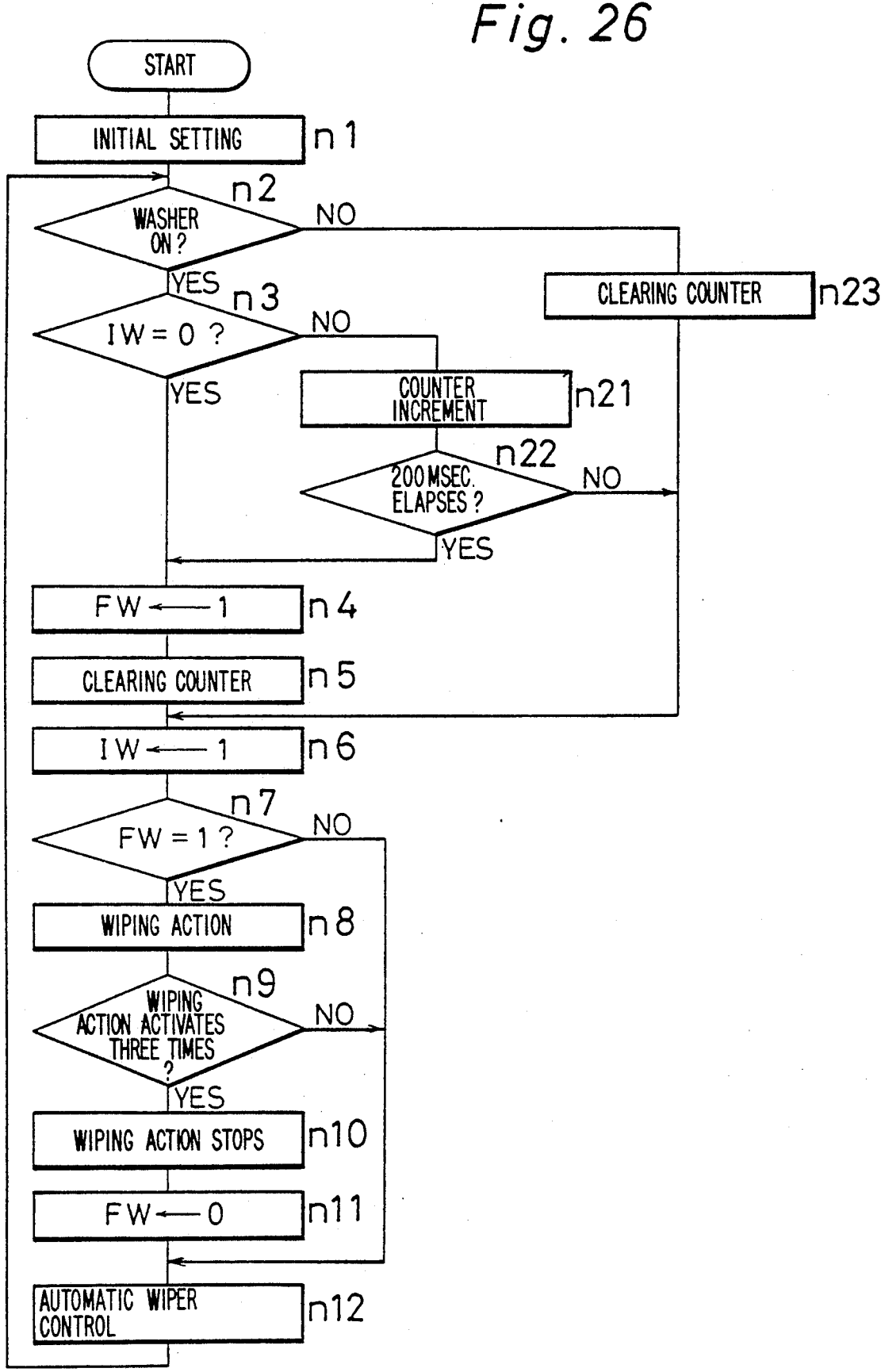
FIG. 26 is flowcharts for explaining the washer interlocked action.

FIG 26 is a flowchart for explaining the washer interlocked action in the OFF mode. When supplying power to the control circuit 31 is started, an initial setting such as setting an initial washer judgement flag IW to 0 is effected in a step n1. In a step n2, a determination is made according to the output of the processing circuit 36 as to whether or not the washer switch 12 is set to the ON mode. When it is in the mode a determination is then made in a step n3 whether or not the initial washer judgement flag IW is 0. I8 so, namely, the control circuit 31 stands by, by the washer interlocking in the OFF mode, the processing proceeds to a step n4.

In the step n4, a washer judgement flag FW to express whether or not it is necessary for the wiping action to be conducted by the washer interlocking is set to 1. In a step n5, a counter to set the time for filter treatment to be carried out in the usual mode judgement described hereinafter is cleared. In a step n6, the initial washer judgement flag IW is set to 1. In a step n7, a determination is made as to whether or not the washer judgement flag FW is 1. I8 so, the wiping action is effected in a step n8.

In a step n9, a determination is made as to whether or not the wiping action has been carried out three time since starting supplying power to the control circuit 31. I8 so, a step n10, the wiping action comes to a stop. Also, in a step n11, after the washer judgement flag FW is set to 0, the processing proceeds to a step n12. I8 not, namely, if the number of wiping actions is less than three times and if the washer judgement flag FW is not 1 in the step n7, namely, when the washer interlocking is not effected, the processing directly proceeds the step n12. In the step n12, on the basis of the output from the rain sensor 4, the automatic wiper control operation is conducted so as to secure the wiping interval best-suited to the level of precipitation, and the processing returns to the step n2.

In the step n3, when the initial washer judgement flag IW is not 0, i.e., when it is not just after the control circuit 31 stands by, the processing proceeds to a step n21. Then, the counter incrementally counts. Then, in a step n22, a determination is made as to whether or not the counted value has reached 200 msec. which is the filter treatment time. If so, namely, when the washer interlocking action is effected in modes other than the OFF mode and the filter treatment time has elapsed, the processing shifts to the step n4. In the step n2, when the washer interlocking is not effected, the processing shifts to the step n6 after the counter is cleared in a step n23. Then, the wiping action is not carried out. In the step n22, when the time 200 msec. has not elapsed, the processing shifts to the step n6 as well, and the wiping action is not carried out.

In the above embodiment, though the mode determination with the washer interlocking is carried out at the same time as the power supply to the control circuit 31 at the time t02 is started, in another embodiment of the present invention a filter treatment which is so short as to eliminated the erroneous judgement shown in FIG. 24 is disposed inserted between the steps n3 and n4, thereby causing the influences due to noise to be decreased.

Figure 27:
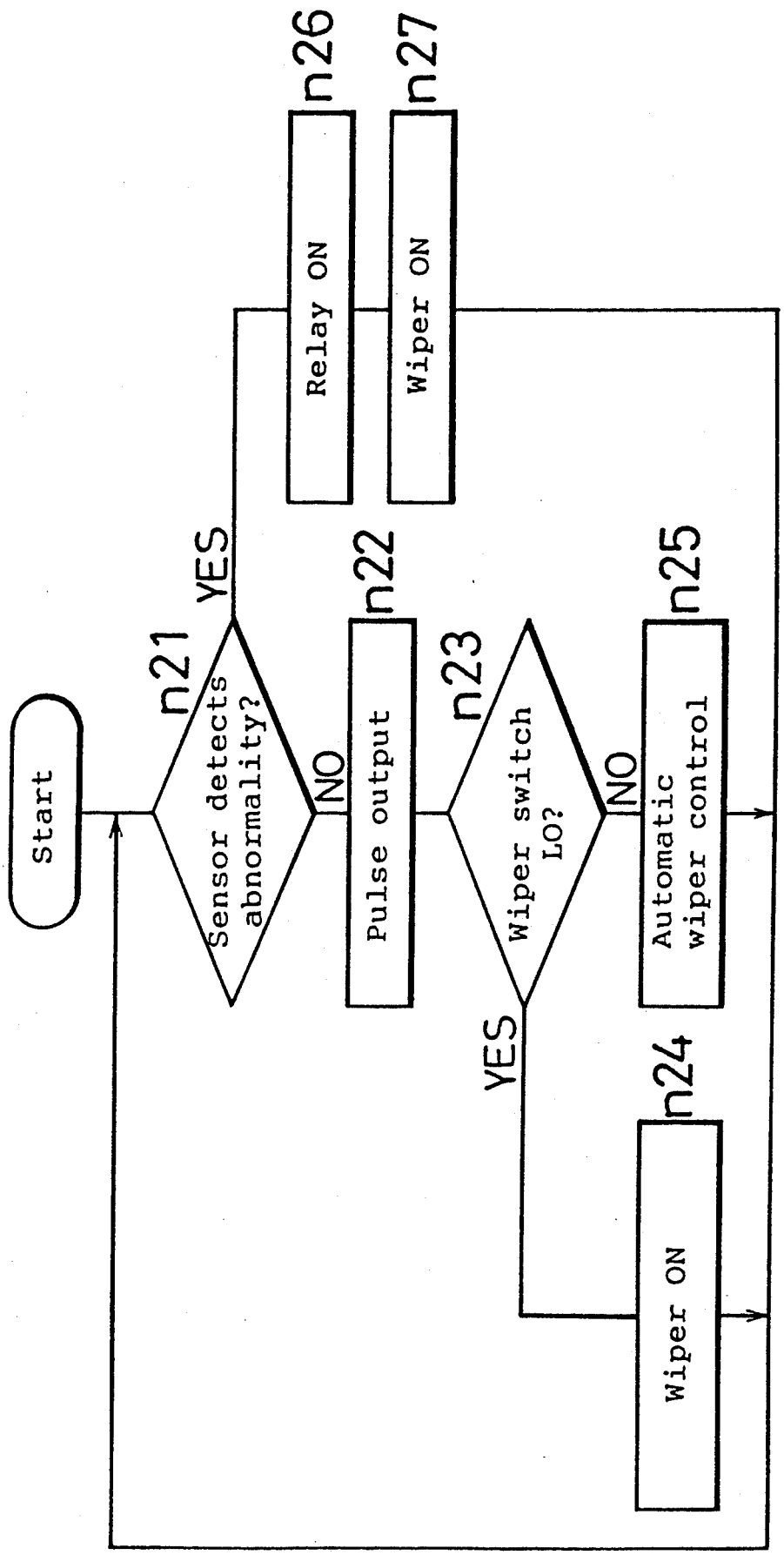
FIG. 27 is a flowcharts for explaining a fail-safe feature in the event that the rain sensor 4 in the windshield wiper control apparatus 10 is out of order.

Also, FIG. 27 is a flowchart for explaining a fail-safe feature for the rain sensor 4 when the wiper switch 11 is set to the INT mode or the LO mode. In a step n21, any abnormality of the rain sensor 4 is detected on the basis of the output from the processing circuit 37. When no abnormality is detected, the inspection pulse is output from the pulse generation circuit 33 in a step n22.

In a step n23, it is judged whether or not the wiper switch 11 is set to the LO mode according to the result of level discrimination in the level discrimination circuit 35. If so, the relay coil L3 is continuously energized in a step n24. After the motor 21 is continuously driven at a low speed, the processing returns to the step n21. Also, in the step n23, when the wiper switch 11 is set to the INT mode, the relay coils L3 and L4 are energized and de-energized on the basis of the detection output from the rain sensor 4. After the automatic wiper control operation is conducted, the processing returns to the step n21.

When an abnormality is detected in the rain sensor 4 in the step n21, the processing shifts to a step n26. The relay coil L5 is energized and the output of the cam switch 22 is directly inputted in the switch circuit 1. In a step n27, the relay coil L3 is energized only for the time of intermittency predetermined by the switch circuit 1. Thereafter, the relay coil L1 of the switch circuit 1 is de-energized and the power is not supplied to the constant voltage circuit 30. Therefore, the relay coil L3 is de-energized to cause the wiper to come to a stop.

Thus, in the windshield wiper control apparatus 10 according to the present invention, the control equipment 3 is provided between the existing switch circuit 1 and the wiper motor 2 for adding the automatic wiper operation, and the control equipment 3 can detect the setting mode of the wiper switch 11 in the switch circuit 1. Therefore, there is no need to further separately add a switch exclusive for the automatic wiper in addition to the existing wiper switch, thereby causing any modification in accompanying with addition of the exclusive switch not to be required. Furthermore, the mounting work can be simplified and the appearance may not be spoiled, too.

Since the control circuit 31 to effect the automatic wiper control operation is so composed as to be power-charged only when the wiper switch 11 is set to the INT mode or the LO mode, the control circuit 31 is caused to be in a pause in the OFF mode or the HI mode, and it is possible to secure the fail-safe feature in an erroneous operation due to excursion of the control circuit 31.

Furthermore, when the wiper switch 11 is set to the INT mode (when washer liquid is not ejected), the mode is determined with the usual period W2 of determination. When the washer is interlocked in the OFF mode, an erroneous determination can be prevented by the determination being made during a shorter period W2a. Thus the wiping actions of at least three times necessary to wipe off the ejected washer liquid can be secured.

In the event that an abnormality occurs in the rain sensor 4, the output of the cam switch 22 is directly inputted in the switch circuit 1, and the motor 21 can be driven with the predetermined time of intermittency. Therefore, even in the event that an abnormality occurs in the rain sensor 4, at least intermittent actions of the wiper blade at a fixed interval can be secured, thereby causing the fail-safe feature to be secured even in the event that the rain sensor 4 is out of order.

Figure 28:
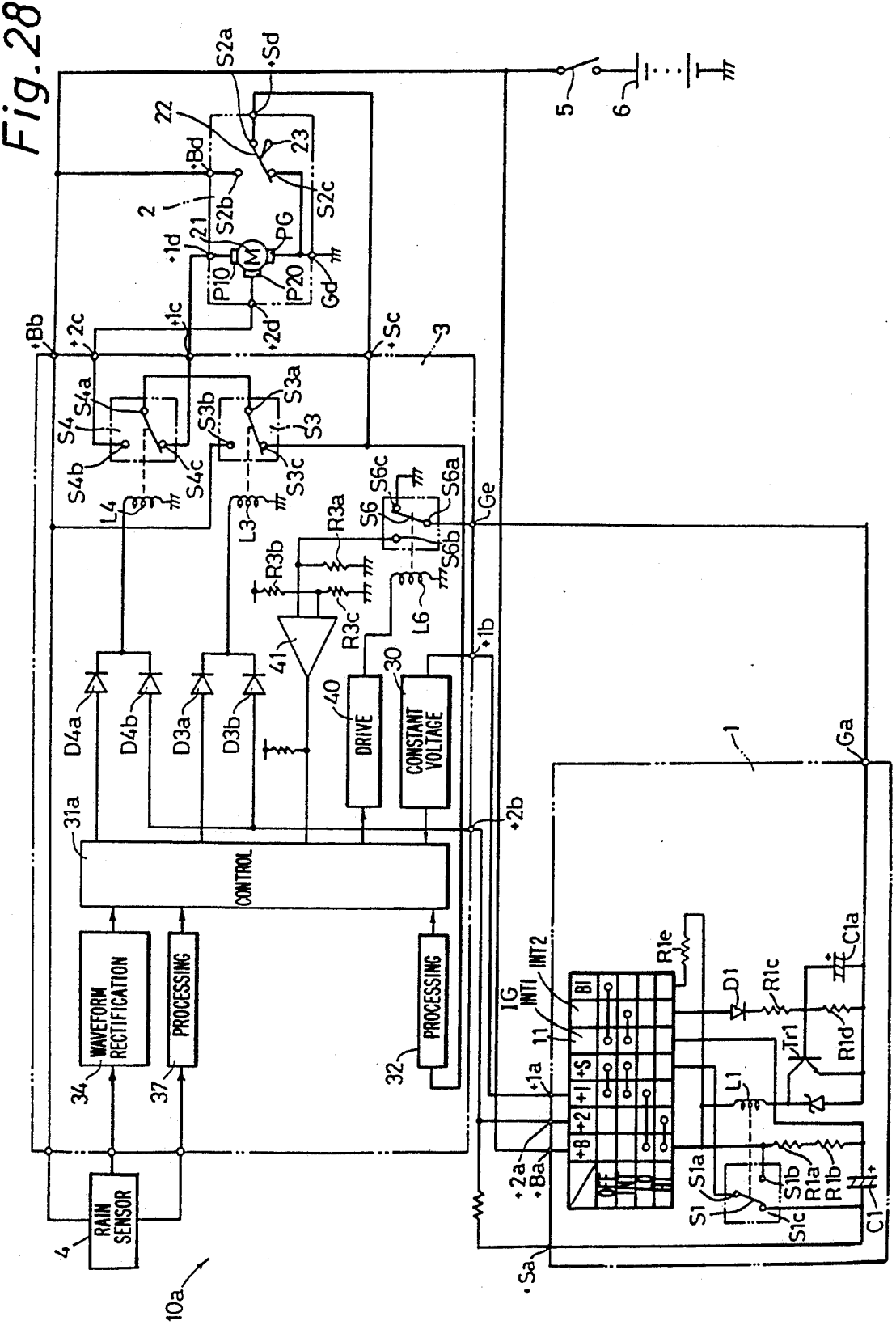
FIG. 28 is a block diagram showing the electrical construction of a windshield wiper control apparatus 10a according to still another embodiment of the present invention.

Next, another embodiment of the present invention for judging the setting state of the wiper switch 11 is described hereinafter. FIG. 28 is a block diagram showing an electrical composition of a windshield wiper control apparatus 10a which is still another embodiment of the present invention, and which is similar to that shown in FIG. 20. All the corresponding parts are given the same reference numbers. In the control apparatus 10a of this embodiment, the OFF mode and the HI mode of the wiper switch 11 are determined by detecting the potential of the terminals +1b and +2b. This is the same as that in the embodiment mentioned above. The point to be noted is that the INT mode and the LO mode can be determined by detecting the difference of consumption power in respective modes since the power consumption in the switch circuit 1 in the INT mode is different from that in the LO mode.

Namely, when the wiper switch 11 is set to the INT mode, the contacts INT1 and INT2 connected to each other. Therefore, base current flows in the base of the transistor Tr1 by way of the resistors R1a and R1b, the diode D1 and the resistor R1c to cause the transistor Tr1 to be turned on. When the transistor Tr1 is turned on, an excitation current of several +mA flows to the relay coil L1. On the contrary, in the LO mode, since the contacts INT1 and INT2 are not connected together, the transistor Tr1 is turned off. Therefore, no excitation current flows to the relay coil L1. Thus, it is possible for a control circuit 31a to determines which mode, the INT mode or the LO mode, the wiper switch 11 is set to, by detecting the presence or absence of the excitation current which flows in the relay coil.

Since the control circuit 31a determines it by the output signal from the constant voltage circuit 30 that the wiper switch 11 is set to either the INT mode or the LO mode, an inspection relay drive signal is outputted to an inspection relay drive circuit 40. Then, an inspection relay coil L6 is energized, a common contact S6a of a relay switch S6 is changed from being connected to an individual contact S6c to being connected to an individual contact S6b. Therefore, the current which flows out from the terminal Ga of the switch circuit 1 flows in a shunt resistor R3a by way of the terminal Ge, the common contact S6a, and the individual contact S6b, and a voltage proportional to the current appears across the shunt resistor R3a. The voltage which appears across the shunt resistor R3a is compared with the threshold voltage which can be secured by resistors 31b and R3c connected in series, by a comparator 41. A result of the comparison is outputted to the control circuit 31a.

If the output of the comparator 41 is at a low level, namely, if no elicitation current flows in the relay coil L1, the control circuit 31a determines that the wiper switch 11 has been set to the LO mode. Also, the output of the comparator 41 is at a high level, namely if an excitation current flows in the relay coil L1, the control circuit 31a determines that the wiper switch 11 has been set to the INT mode.

When the control circuit 31a determines that the wiper switch 11 has been set to the LO mode, it outputs the drive signal to the relay coil L3. Also, when the control circuit 31a determines that the wiper switch 11 has been set to the INT mode, the control circuit 31a inputs the detected signal of the rain sensor 4, whose waveform has been rectified by the waveform rectification circuit 34, determines the time of intermittency on the basis of the detected values, and outputs the drive signal to the relay coil L3 during every time of intermittency, thereby causing the automatic wiper control as shown in the above to be accomplished.

Figure 29:
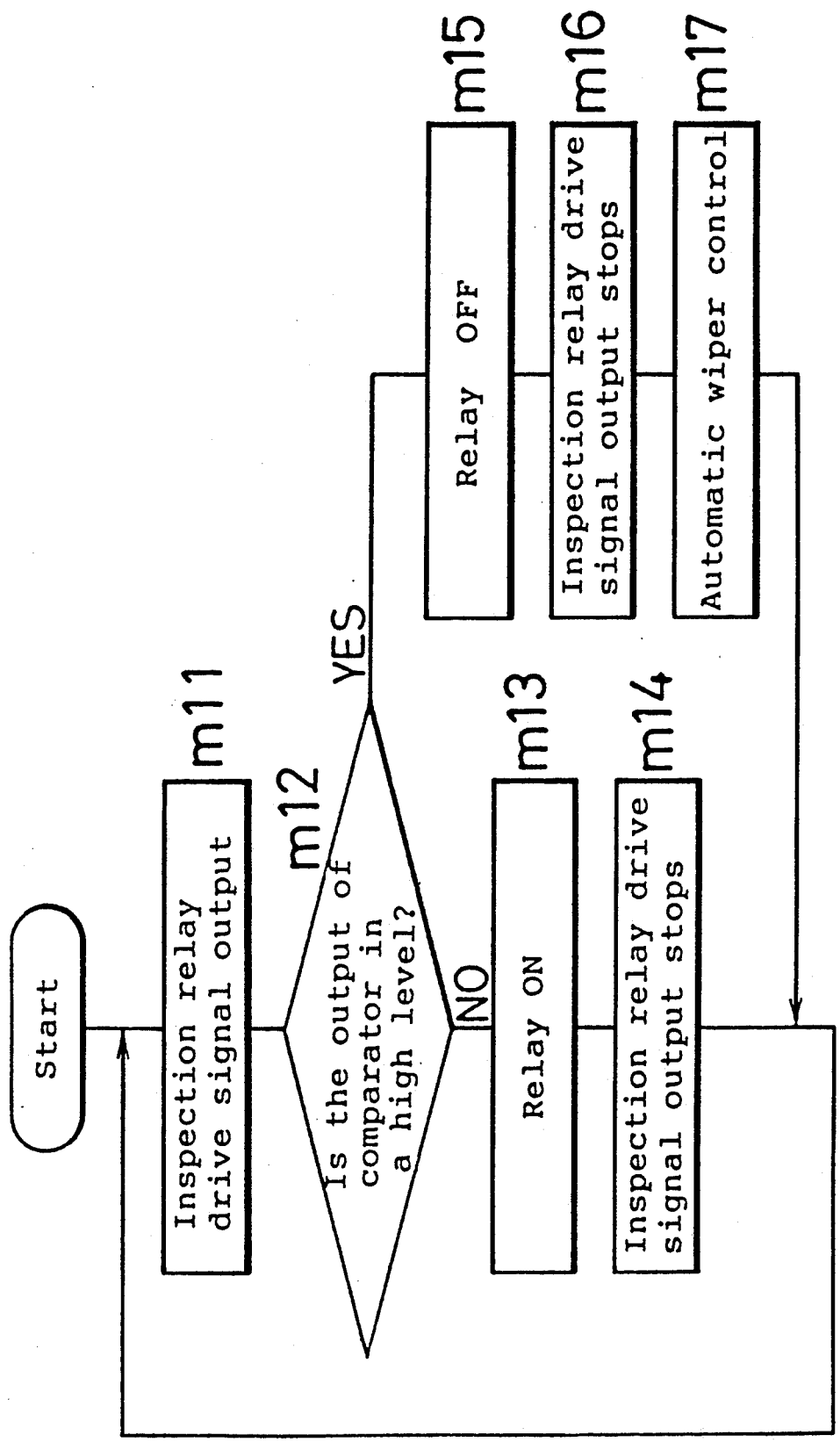

The action of the control circuit 31a explained above si further described in detail in conjunction with a flow-chart of FIG. 29. Firstly, in a step m11, the inspection relay drive signal is outputted to the inspection relay drive circuit 40, and the common contact S6a of the relay switch S6 is connected to individual contact S6b of the switch, thereby causing the current of the switch circuit 1 to flow in the shunt resistor R3a.

In a step m12, a determination is made as to whether or not the output of the comparator 41 is at a high level. When it is at a high level, the wiper switch 11 is in the INT mode, and the processing proceeds to a step m15, wherein outputting the drive signal to the relay coil L3 comes to a stop. Further more, in a step m16, in order to terminate the inspection of the setting state of the wiper switch 11, the output of the inspection relay drive signal to the inspection relay drive circuit 40 is caused to stop. The processing proceeds to a step m17, and the control circuit 31a determines the time of intermittency to activate the wiper in accordance with the detected signal from the rain sensor 4 and outputs the drive signal to the relay coil L3 at every time of intermittency.

In the step m12, when the output of the comparator 41 is not in the high level, the wiper switch 11 has been set to the LO mode, and in a step m13, the drive signal is continuously outputted to the relay coil L3 to rotate the motor 21 at a low speed. Then, the processing proceeds to a step m14, and the output of the inspection relay drive signal to the inspection relay drive circuit 40 is caused to stop.

As described above, also in this embodiment, it is possible to judge the setting states, especially the INT mode or the LO mode, by detecting the difference of the current of the switch circuit 1 according to the setting state of the wiper switch 11.

Figure 30:
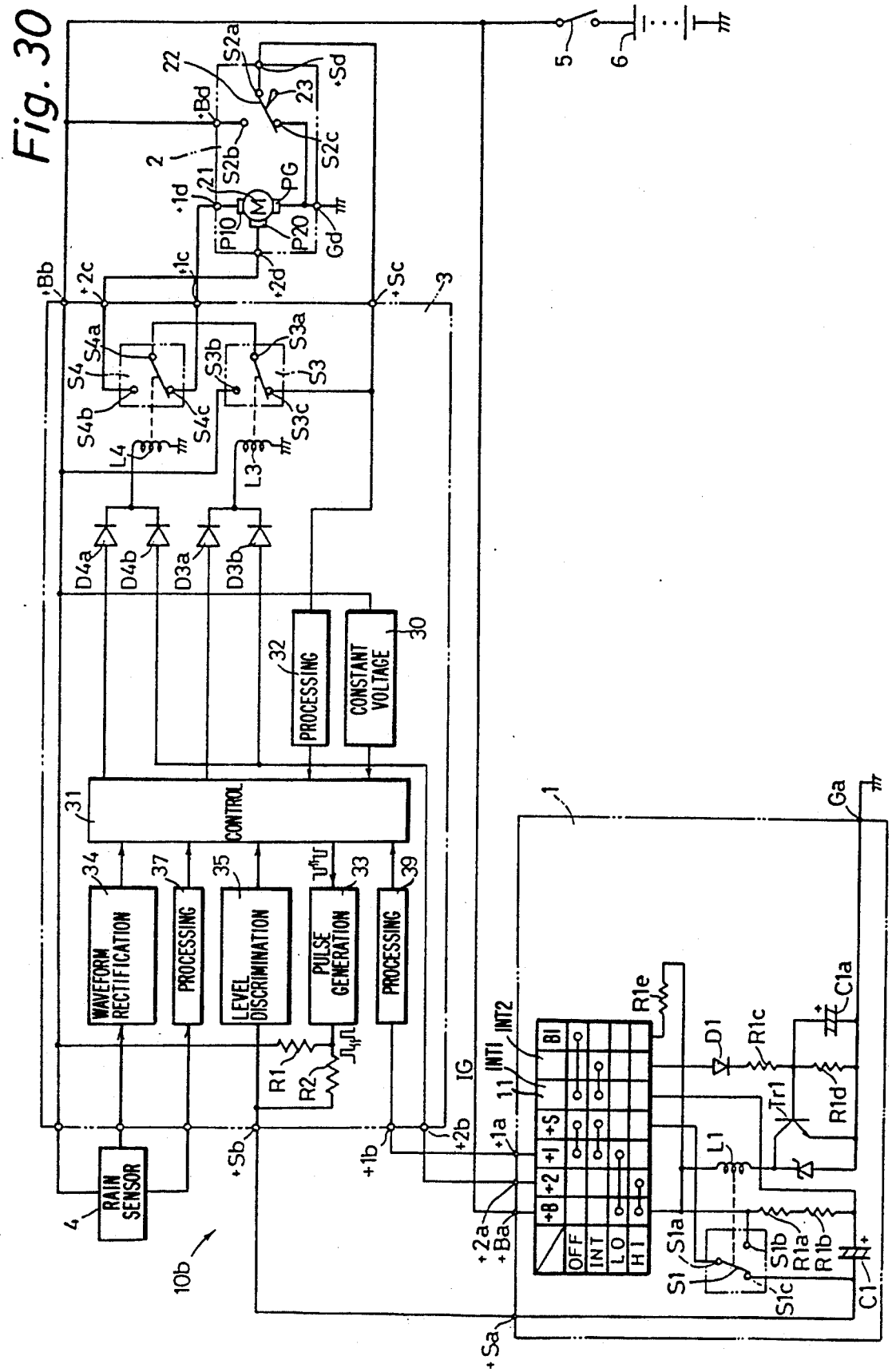
FIG. 30 is a block diagram showing the electrical construction of a windshield wiper control apparatus 10b according to another embodiment of the present invention.

FIG. 30 is a block diagram showing the electrical composition of a windshield wiper control apparatus 10b of still another embodiment of the present invention. This embodiment is similar to the embodiment shown FIG. 20 described in above, and all the corresponding parts are given the same reference numbers. In this embodiment, in the event that an abnormality occurs in the rain sensor 4, a signal similar to the output signal of the cam switch 22 which is inputted by way of the above processing circuit 32 is fed to the terminal +Sb by way of the pulse generation circuit 33. For this reason, the voltage IG by way of the terminal +Bb is supplied to the constant voltage circuit 30, and the potential of the contact +1 of the wiper switch 11 is detected by a processing circuit 39 by way of the terminals +1a and +1b and is inputted in the control circuit 31.

Figure 31:
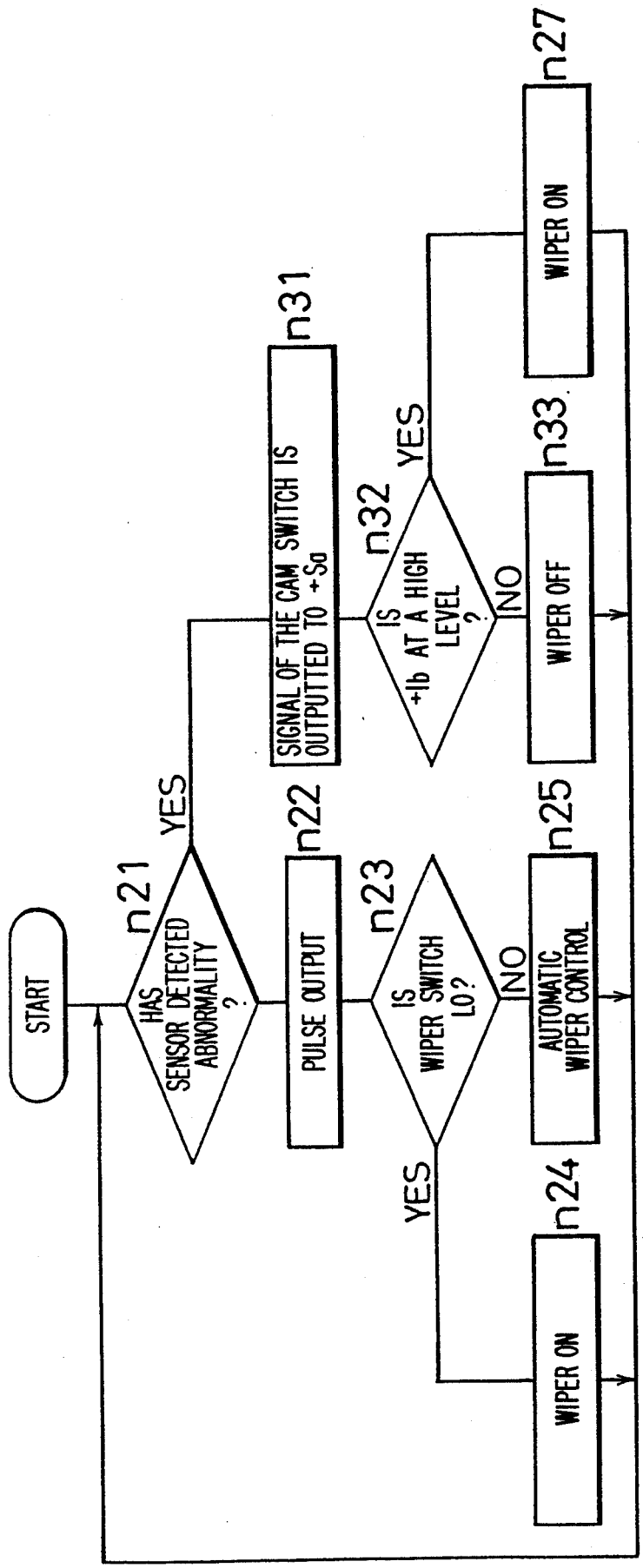
FIG. 31 is a flowcharts for explaining the fail-safe feature in the event that the rain drop sensor 4 in the windshield wiper control apparatus 10b is out of order.

Therefore, the action in this embodiment will be just as shown in FIG. 31, and is similar to that shown in FIG. 27. All the corresponding parts are given the same reference numbers. In the event that an abnormality of the rain sensor 4 is detected in the step n21, the processing proceeds to a step n31, wherein the output signal of the cam switch 22, which is inputted by way of the processing circuit 32 is fed to the terminal +Sa of the switch circuit 1 through the pulse generation circuit 33 as is.

In a step n32, the processing circuit 39 determines whether or not the terminal +1b is at a high level, namely, whether or not the wiper switch 11 is set to the INT mode. I8 so, the intermittent wiper action is carried out in the step n27. If not, the wiper action comes to a stop in a step n33 and the processing returns to the step n21.

Thus, since this embodiment is so composed that the output corresponding to the output signal from the cam switch 22 can be output by way of the pulse generation circuit 33, such a composition as including the relay switch S5 and the relay coil L5 can be eliminated.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A windshield wiper control apparatus, wherein a raindrop sensor for detecting raindrops is provided and a wiper blade is driven according to an accumulated value obtained by accumulatively calculating the output of said raindrop sensor exceeding a predetermined threshold value, comprising:
   means for comparing an output signal level of said raindrop sensor with a given value; and
   correcting means for, when the output signal level of said raindrop sensor is smaller than said given value, correcting said level of the output signal of said raindrop sensor so as to make it larger, on the basis of the output of said comparing means.

2. A windshield wiper control apparatus, wherein a raindrop sensor for detecting raindrops is provided and a wiper blade is driven according to an accumulated value of pulses obtained by accumulatively calculating an output of said raindrop sensor exceeding a predetermined threshold value, comprising:
   means for comparing a level of an output signal of said raindrop sensor with a given value; and
   controlling means for, when the output signal level of said raindrop sensor is smaller than said given value, accumulatively calculating the number of pulses of the output signal of said raindrop sensor, and, when the output signal level of said raindrop sensor exceeds said given value, accumulatively calculating the width of pulses of said output signal, and, when one of said accumulative values exceeds a prefixed threshold value which is respectively provided, driving said wiper blade, on the basis of the output of said comparing means.

3. A windshield wiper control apparatus, wherein a raindrop sensor for detecting raindrops is provided and a wiper blade is driven according to an accumulated value of pulses obtained by accumulatively calculating the output of said raindrop sensor exceeding a predetermined threshold value, comprising:
   means for comparing an output signal level of said raindrop sensor with a given value; and,
   correcting means for, when the output signal level of said raindrop sensor is smaller than said given value, correcting said threshold value to a value smaller than a value corrected when the output signal level of said raindrop sensor is greater than said given value, on the basis of the output of said comparing means.

4. A windshield wiper control apparatus as claimed in claim 3, wherein the number of pulses of the output signal of said raindrop sensor is accumulatively calculated when said threshold value is corrected to a smaller value, the width of pulses of said output signal is accumulatively calculated when said threshold value is corrected to a larger value, and said wiper blade is driven at a time when one of said accumulated values exceeds a respective threshold value.

5. A windshield wiper control apparatus comprising:
   a driving means for reciprocating a wiper blade;
   a raindrop detecting means for detecting raindrops;
   means for detecting an abnormality of said raindrops detecting means;
   a control means for automatically controlling said driving means so as to effect an action status corresponding to a level of precipitation in response to an output of said raindrop detecting means; and
   a fail-safe means for, when said abnormality detecting means detects an abnormality of said raindrop detecting means while said control means performs the automatic control, intermittently driving said driving means with a predetermined intermittent interval irrespective of an output of said raindrop detecting means.

6. A windshield wiper control apparatus comprising:
a driving means for reciprocating a wiper blade;
a first control means having a HI switch for driving said wiper blade in a continuous high speed drive mode, a LO switch for driving said wiper blade in a continuous low speed drive mode, an INT switch for intermittently driving said wiper blade, and an OFF switch for stopping said wiper blade, and for directly driving said driving means when said HI switch is on;
a raindrop detecting means for detecting raindrops; and
a second control means, disposed between said driving means and said first control means, wherein electric power is supplied when said INT switch or LO switch is turned on, the power supply is stopped when said HI switch or OFF switch is turned on, and when the power is supplied, it is distinguished whether the INT switch or LO switch is turned on, and a result of this distinguishing, if the INT switch is turned on, said driving means is controlled so that said wiper blade is driven in a drive mode corresponding to the state of precipitation, in response to the output of said raindrop detecting means, and if the LO switch is turned on, said wiper blade is controlled so as to be driven continuously in said low speed drive mode.

7. A windshield wiper control apparatus as claimed in claim 6, wherein said first control means includes a time constant circuit having an impedance which is varied in accordance with the switching state of said HI, LO and INT switches, and wherein said second control means supplies a distinguishing signal to said time constant circuit and determines if said INT switch or LO switch is turned on in response to a peak value of the output of said time constant circuit.

* * * * *